US012217584B2

(12) United States Patent
Meron et al.

(10) Patent No.: US 12,217,584 B2
(45) Date of Patent: Feb. 4, 2025

(54) OBSCURATION CLOUD GENERATOR

(71) Applicant: Essence Security International (E.S.I.) Ltd., Herzlia Pituach (IL)

(72) Inventors: Sergey Meron, Netanya (IL); Avi Zeilig, Rosh HaAyin (IL); Pavel Lindberg, Rosh HaAyin (IL)

(73) Assignee: Essence Security International (E.S.I.) Ltd., Herzlia Pituach (IL)

( * ) Notice: Subject to any disclaimer, the term of this patent is extended or adjusted under 35 U.S.C. 154(b) by 384 days.

(21) Appl. No.: 17/415,028

(22) PCT Filed: Dec. 18, 2019

(86) PCT No.: PCT/IL2019/051386
§ 371 (c)(1),
(2) Date: Jun. 17, 2021

(87) PCT Pub. No.: WO2020/129062
PCT Pub. Date: Jun. 25, 2020

(65) Prior Publication Data
US 2022/0044535 A1 Feb. 10, 2022

(30) Foreign Application Priority Data
Dec. 18, 2018 (IL) .......................................... 263811

(51) Int. Cl.
*G08B 15/02* (2006.01)

(52) U.S. Cl.
CPC .................................... *G08B 15/02* (2013.01)

(58) Field of Classification Search
CPC ........ G08B 15/02; G08B 29/046; E05G 1/12; F41H 9/04; F41H 9/06; F41H 9/08
(Continued)

(56) References Cited

U.S. PATENT DOCUMENTS 4,024,986 A 5/1977 Fegley et al.
4,062,303 A 12/1977 Fegley
(Continued)

FOREIGN PATENT DOCUMENTS

DE 29520736 3/1996
EP 2719432 4/2014
(Continued)

OTHER PUBLICATIONS

Office Action dated Sep. 12, 2021 From the Israel Patent Office Re. Application No. 263810 and Its Translation Into English. (4 Pages).
(Continued)

*Primary Examiner* — Ishal Pancholi

(57) ABSTRACT

An obscuration cloud generation device (100) is disclosed. It may comprise a container (104) for holding an obscuration cloud generating canister (110), wherein a composition for forming the obscuration cloud is emitted from the obscuration cloud generating canister (110) in response to activating the obscuration cloud generating canister (110). It may further comprise a housing (101) having a frame (103) wherein the container (101) is removably held inside the frame (103). The housing (101) has an opening (105) and a door (102), the door (102) being movable between a closed state for covering the opening (105) and an open state for emission of the composition from the device (100) via the opening (105). The opening (105) is shaped and sized to
(Continued)

allow the container (104) to be extracted from the housing (101) through the opening (105) when the door (102) is open to replace the obscuration cloud generating canister (110).

20 Claims, 20 Drawing Sheets

(58) Field of Classification Search
USPC ........................................ 222/3; 116/75, 214
See application file for complete search history.

(56) References Cited

U.S. PATENT DOCUMENTS

| | | | |
|---|---|---|---|
| 4,062,473 A | 12/1977 | Fegley | |
| 5,300,260 A * | 4/1994 | Keshet | B05B 7/0012 261/81 |
| 5,392,768 A * | 2/1995 | Johansson | G01F 1/50 128/200.14 |
| 8,881,999 B2 * | 11/2014 | Blaylock | A61L 9/122 239/338 |
| 11,045,820 B2 | 6/2021 | Echeverria | |
| 2017/0209840 A1 | 7/2017 | Swallow et al. | |
| 2018/0087769 A1 | 3/2018 | Pircs | |
| 2018/0126394 A1 | 5/2018 | Echeverria | |
| 2022/0044536 A1 | 2/2022 | Meron et al. | |

FOREIGN PATENT DOCUMENTS

| | | |
|---|---|---|
| EP | 2778599 | 9/2014 |
| EP | 3319056 | 5/2018 |
| ES | 2609752 | 8/2020 |
| GB | 2048534 | 12/1980 |
| GB | 2449678 | 12/2008 |
| JP | 2015-043143 | 3/2015 |
| WO | WO 2020/129062 | 6/2020 |
| WO | WO 2020/129063 | 6/2020 |
| WO | WO 2022/249173 | 12/2022 |

OTHER PUBLICATIONS

Ex Parte Quayle Action Dated Jan. 26, 2022 from U.S. Appl. No. 17/415,123. (14 pages).
International Search Report and the Written Opinion dated Sep. 14, 2022 From the International Searching Authority Re. Application No. PCT/IL2022/050544. (13 Pages).
Office Action dated Dec. 21, 2021 From the Israel Patent Office Re. Application No. 263811. (4 Pages).
Notice of Allowance dated Apr. 14, 2022 from U.S. Appl. No. 17/415,123. (8 pages).
International Preliminary Report on Patentability dated Jul. 1, 2021 From the International Bureau of WIPO Re. Application No. PCT/IL2019/051386. (21 Pages).
International Preliminary Report on Patentability dated Jul. 1, 2021 From the International Bureau of WIPO Re. Application No. PCT/IL2019/051387. (8 Pages).
International Search Report and the Written Opinion dated Jul. 2, 2020 From the International Searching Authority Re. Application No. PCT/IL2019/051386. (27 Pages).
International Search Report and the Written Opinion dated Mar. 2, 2020 From the International Searching Authority Re. Application No. PCT/IL2019/051387. (12 Pages).
Invitation to Pay Additional Fees, Communication Relating to the Results of the Partial International Search and the Provisional Opinion dated Mar. 25, 2020 From the International Searching Authority Re. Application No. PCT/IL2019/051386. (17 Pages).
XAFER Security Components "XAFER Security Components. Corporate Video ENG 2.0", Retrieved from the Internet. Published Jun. 26, 2018, 1 page.
International Preliminary Report on Patentability dated Dec. 7, 2023 From the International Bureau of WIPO Re. Application No. PCT/IL2022/050544. (8 Pages).

* cited by examiner

OBSCURATION CLOUD GENERATOR

RELATED APPLICATIONS

This application is a National Phase of PCT Patent Application No. PCT/IL2019/051386 having International filing date of Dec. 18, 2019, which claims the benefit of priority of Israel Patent Application No. 263811 filed on Dec. 18, 2018.

PCT Patent Application No. PCT/IL2019/051386 is also related to co-filed PCT Patent Application No. PCT/IL2019/051387, entitled “OBSCURATION CLOUD GENERATOR”, which claims the benefit of priority of Israel Patent Application No. 263810 filed on Dec. 18, 2018.

The contents of the above applications are all incorporated by reference as if fully set forth herein in their entirety.

FIELD AND BACKGROUND OF THE INVENTION

The present invention, in some embodiments thereof, relates to an obscuration cloud generation device and, more particularly, but not exclusively, to a container for an obscuration cloud generating canister which is thermally isolating and releasable from the housing of the device.

An obscuration cloud generator (e.g. a smoke screen generator or other particle cloud generator) may be triggered to generate an obscuration cloud by an alert condition in order to ward off an intruder. For example, in response to a detection of an intruder, e.g. by a passive infrared detector (PIR) or other sensor, a smoke generator may be triggered to generate and release smoke to scare off the intruder.

The obscuration cloud generator includes a canister which may generate an obscuration cloud by releasing a pressured gas and/or by generating and releasing a gas at high pressure by means of exothermic reaction. The canister may include a pair of electrical contacts which when provided with electrical power can trigger the canister to emit the visibility obscuring material.

Reference to any prior art in this specification is not an acknowledgement or suggestion that this prior art forms part of the common general knowledge in any jurisdiction, or globally, or that this prior art could reasonably be expected to be understood, regarded as relevant/or combined with other pieces of prior art by a person skilled in the art.

SUMMARY OF THE INVENTION

Various aspects and embodiments of the present disclosure are defined by the appended claims. Other aspects and/or embodiments of the present invention will be apparent from the description which follows. It will be appreciated that features and aspects of the present disclosure may be combined with other different aspects of the disclosure as appropriate, and not just in the specific illustrative combinations described herein.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced. Like numerals in different figures are intended to refer to the same parts or, if required by the context, corresponding similar parts.

In the drawings.

DESCRIPTION OF EMBODIMENTS OF THE INVENTION

Figure 1:
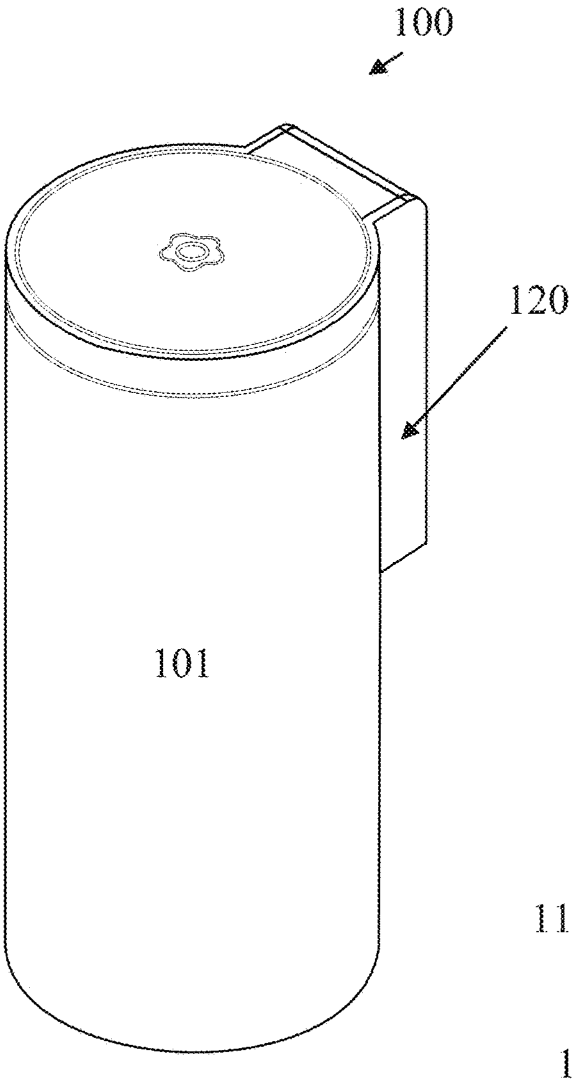
FIG. 1 is a schematic illustration of an exemplary obscuration cloud generation device, according to some embodiments of the present invention.

The present invention, in some embodiments thereof, relates to an obscuration cloud generation device and, more particularly, but not exclusively, to a container for an obscuration cloud generating canister which is thermally isolating and releasable from the housing of the device.

A security system may include and control an obscuration cloud generating device. The present inventors have identified that such canisters are generally explosive and/or otherwise hazardous if improperly disposed or handled. Furthermore, the canister may require a tool to be accessed, making replacement of the canister difficult. Further disposal may require disassembly of the canister into its components to be separately handled thereafter.

According to some embodiments of the present invention, there is provided a container for holding an obscuration cloud generating canister for use in an obscuration cloud generation device, which in some embodiments is wall mountable. The container may be easily removed from a housing of the device when canister replacement is to be performed. The removal of the container may be done via an opening, shaped and sized for this purpose, of the housing. The opening is covered by a door, which may be opened to allow canister emission of the composition from the device, and advantageously the same door also may be opened to allow removal of the container, thereby facilitating easy and/or intuitive access to the canister.

The container may be held in the housing by a quick release mechanism that enables the container to be extracted from the housing easily, without tools, and by applying a relatively small force to facilitate removal by human hands. The quick release mechanism may include a handle having a closed position wherein the handle is laid inside a recess on the container, and an open position wherein a force may be applied to turn the handle and another force may be applied to pull the handle for releasing the container from the frame.

The container may include a container frame and a container cover, both made of thermally insulating material, so the canister is mostly or entirely covered from all directions except from an opening at an end opposite to container cover. The canister is exposed through the opening, so the dissipation of heat created by emission when the canister is activated is directed to exit the device via the opening. The container may include internal protrusions for holding the canister and create an air gap between the container frame and the canister for further thermal insulation.

The container may include guiding members, such as rails, that position the container when inserted into the housing. The guiding members may be configured to keep the container at a specific radial orientation for electrical contacts on the container to engage with corresponding electrical contacts inside the housing.

The container may include an angled outlet, so a composition emitted from the obscuration cloud generating canister is emitted in a defined direction that is off a longitudinal axis of the obscuration cloud generating canister. The container may include an alignment element for holding the obscuration cloud generating canister in a specific angular orientation inside the container, to maintain the direction of the emission.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various other ways.

Referring now to the drawings, FIG. 1 is a schematic illustration of an exemplary obscuration cloud generation device, according to some embodiments of the present invention. Device 100 includes a mounting portion 120 removably attached to a housing 101. Housing 101 may be made, for example, from a high temperature thermoplastic.

Figure 2:
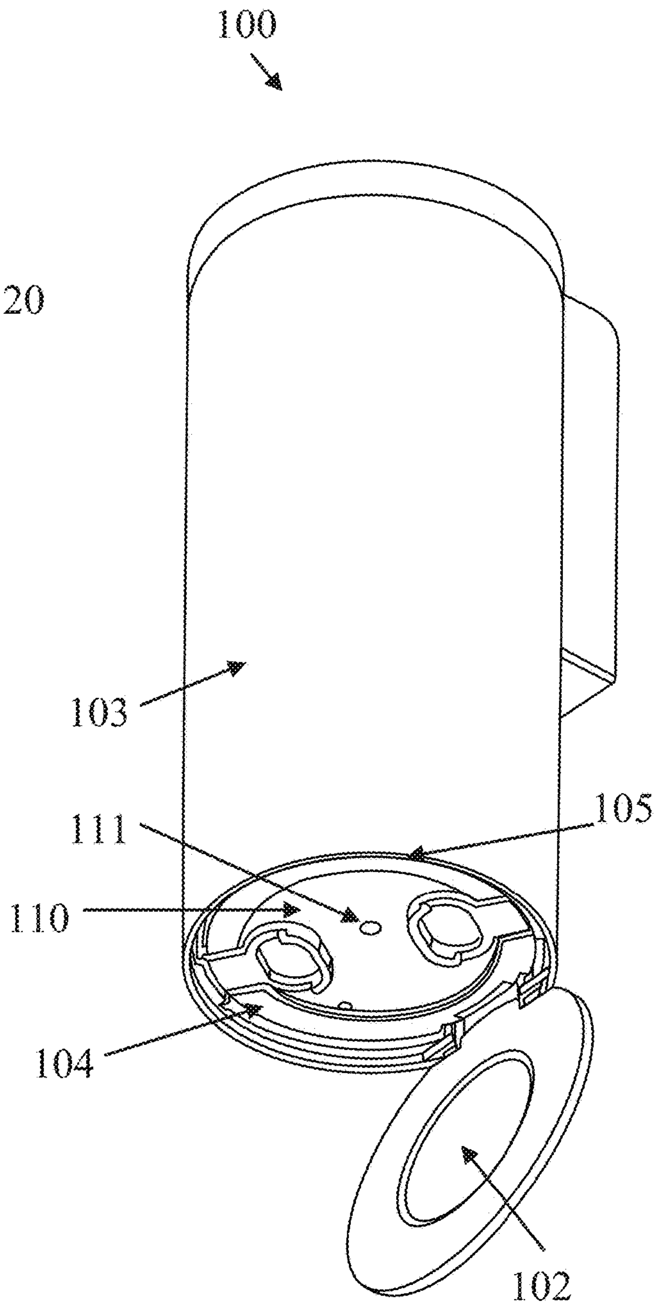
FIG. 2 is a schematic illustration of the exemplary obscuration cloud generation device of FIG. 1, with the door open, according to some embodiments of the present invention.

Reference is also made to FIG. 2, which is a schematic illustration of the exemplary obscuration cloud generation device of FIG. 1, with the door open, according to some embodiments of the present invention. Housing 101 includes a door 102 and a frame 103. Device 100 also includes a container 104, which is removably held inside the frame 103. Frame 103 may for example have a cylindrical cavity for containing the container 104, which is also cylindrical. Container 104 holds a cylindrical obscuration cloud generating canister 110, for example within a cylindrical cavity in the container 104. The door 102 may be positioned at an opposite end of the frame 103 to the mounting portion 120, which may be directed downwardly in use.

When the cloud generating canister 110 is activated (by application of a predefined voltage across a pair of terminals extending from the canister cylinder), one or more gaseous jets of the cloud-forming composition are emitted from a bottom outlet 111 of the cloud generating canister 110 and push the door 102, by the pressure of the emission. The door therefore acts as the outlet of device 100. The door 102 is movable between a closed state for covering an opening 105 of the housing 101 and an open state for emission of the composition from the device 100 via the opening 105.

The obscuration cloud generating canister 110 may be replaced after it has been activated and used up. The obscuration cloud generating canister 110 may be provided with or in the container 104 or may be acquired separately from the container, and may be provided with or in device 100 or separately from device 100. Similarly, container 104 may be provided with device 100, with obscuration cloud generating canister 110 or separately. In some embodiments, however, the container 104 includes the canister 110 during transport and/or storage. The opening 105 is shaped and sized to allow the container 104 to be extracted from the housing 101 through the opening 105 when the door 102 is open, to replace the obscuration cloud generating canister 110.

Figure 3A:
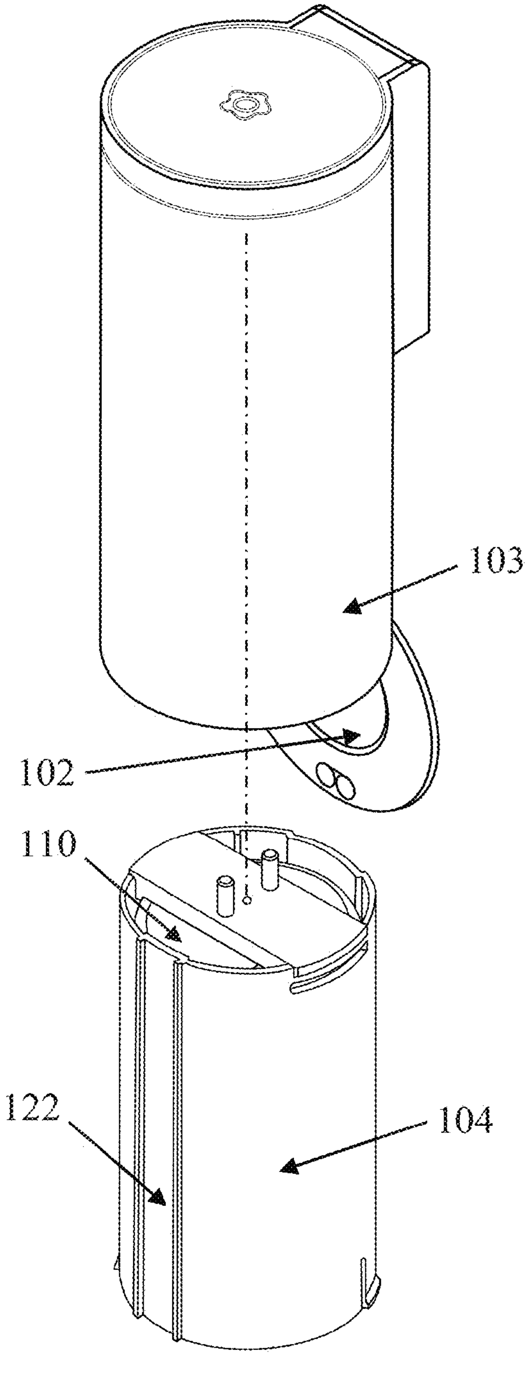
FIGS. 3A and 3B are schematic illustrations of the exemplary obscuration cloud generation device of FIG. 1, with the container removed, according to some embodiments of the present invention.
Figure 3B:
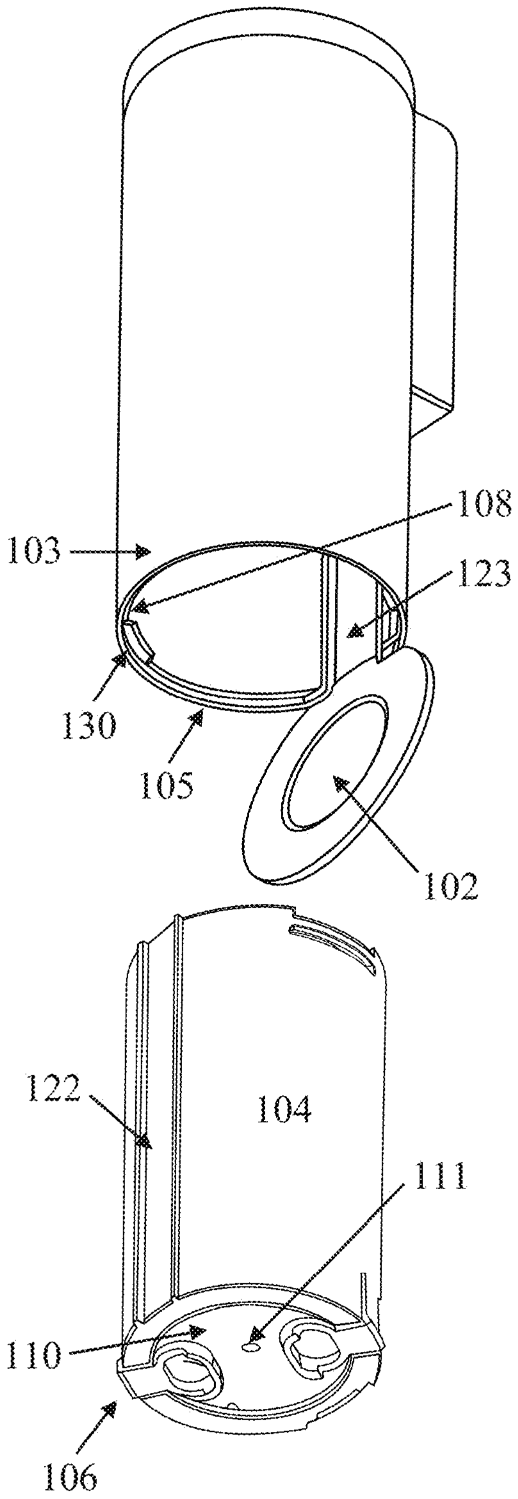
Figure 4A:
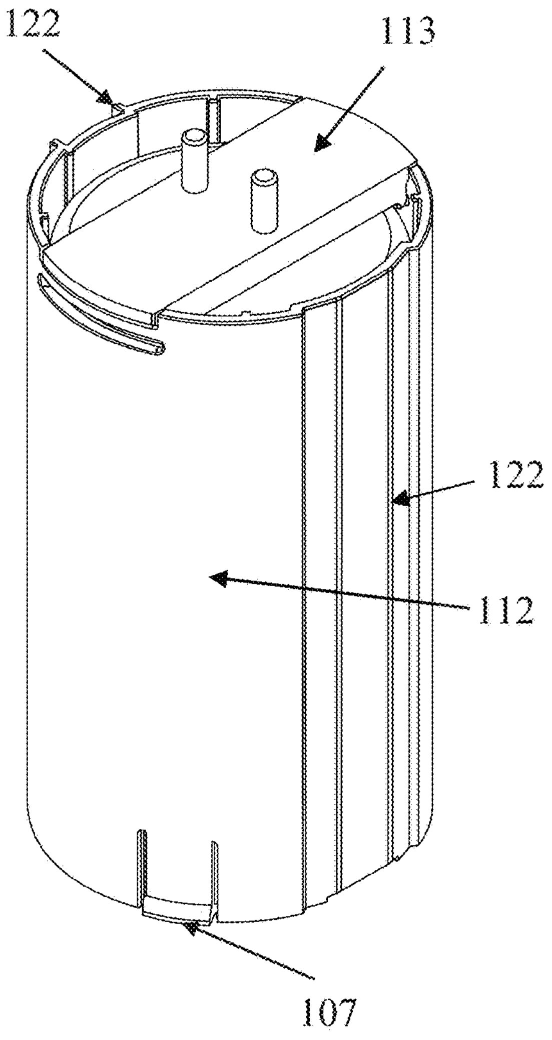
FIGS. 4A and 4B are schematic illustrations of the container of the exemplary obscuration cloud generation device of FIG. 1, according to some embodiments of the present invention.
Figure 4B:
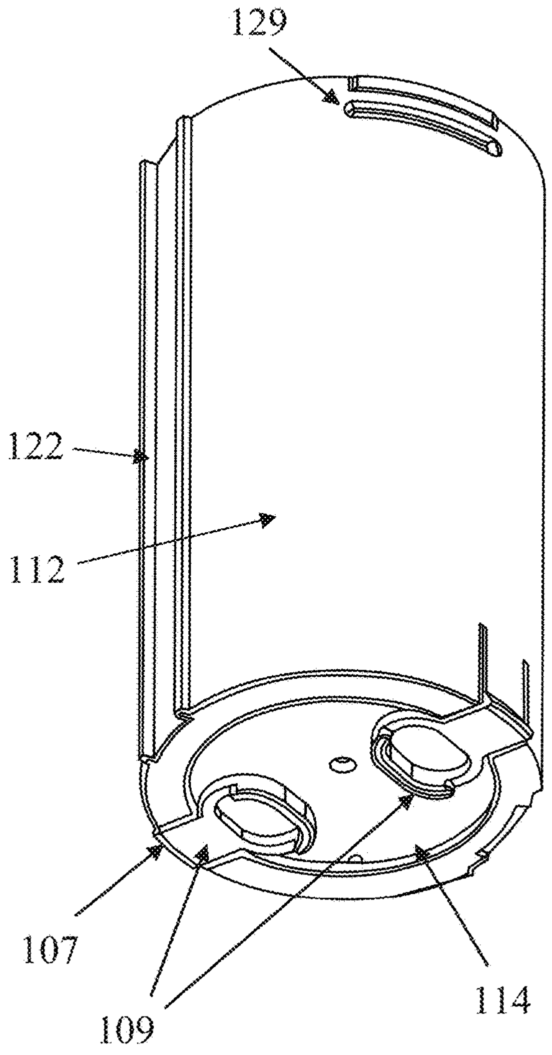

Reference is now made to FIGS. 3A and 3B, which are schematic illustrations of the exemplary obscuration cloud generation device of FIG. 1, with the container removed, according to some embodiments of the present invention. Reference is also made to FIGS. 4A and 4B, which are schematic illustrations of the container of the exemplary obscuration cloud generation device of FIG. 1, according to some embodiments of the present invention.

The container 104 may be removably held inside the frame 103 by a quick release mechanism 106. The quick release mechanism 106 may be located at an emission end of the container 104, which may be at the bottom of the device 100 in use, and is accessible via the door 102 when the door 102 is open. The quick release mechanism may include one or more members on the container 104 for selectively engaging or disengaging from a corresponding member on the housing 101 to respectively secure the container 104 in the housing 101 or enable withdrawal of the container 104 from the housing 101. The members may be, for example, protrusion(s) and corresponding recess(es). In some embodiments, as shown in the figures, the quick release mechanism 106 includes one or more movable member(s) 109 having respective retractable protrusion(s) 107 (for example two) on the container 104 and one or more recess(es) 108 (for example two) on the housing 101. The protrusion(s) 107 are adjustably engaging or disengaging with the corresponding recess(es) 108. The recessing in the case of FIG. 3B being recessed spaces above respective inwardly protruding ridges 130 at the bottom of the housing (only one ridge is clearly visible in the figure, but the other may be located in a diametrically opposite location on the diameter of the frame 103). In other embodiments (not shown), a circumferential recess may be provided by a region above in inwardly directed collar at the bottom of the housing 103, by the region having a wider inner diameter than that of the collar.

In other embodiments (not shown), the quick release mechanism includes one or more recess(es) on the container 104 for adjustably engaging or disengaging with a corresponding one or more retractable protrusion(s) on the housing 101. The protrusion(s) may be positioned on one or more movable member(s) (for example two) for selectively engaging or disengaging with recess(es) by a user.

In the exemplary embodiment shown in figures, the movable members are clips having respective finger holes, wherein the quick release mechanism is released by applying squeezing force applicable by fingers in the finger holes to move the two movable members 109 closer together, thus pulling protrusions 107 to retract the protrusions 107 out of the recesses 108. The force required to overcome a holding force of the quick release mechanism 106 may be a squeezing force applicable by a person's hands, to allow easy removal of the container 104. Thus, the quick release mechanism may be operable without the need of a tool.

In other embodiments, other quick release mechanisms may be used, for example a mechanism which locks the top of container 104 to an inner part of housing 101 by a rotational movement of a predefined amount.

The container 104 may include a container frame 112 sized and shaped to accommodate the obscuration cloud generating canister 110, for example in an elongate cylindrical cavity. The container 104 may also include a container cover 113 releasably attached to the container frame 112 to close the end of the obscuration cloud generating canister which is at a top end opposite to the bottom outlet 111. The container cover 113 allows extracting the obscuration cloud generating canister 110 from the container 104, and prevents the obscuration cloud generating canister 110 from inadvertently falling out of the top of the container 104 when handled.

The container cover 113 may be attached to the container frame 112 by a quick release mechanism based on similar concepts to the quick release mechanism 106 described above for the container 104 and the housing 101. For example, in some embodiments, the container cover 113 may include protrusions 128 (shown in FIG. 5B) that are inserted into recesses 129 of container frame 112 (shown in FIG. 4B), and which may be squeezed together to release the cover 113. This quick release mechanism allows opening the container 104 without a tool for accessing and extracting the obscuration cloud generating canister 110 from the frame 112 by sliding the canister 110 from the frame 112 without first needing to further disengage the canister 110 from the container 104. Thus, the canister 110 can be freely removed from the frame 112 once the quick release mechanism is disengaged to freely open the container 104. Further, the disengagement of the quick release mechanisms, both the one to remove the canister 110 from the container 104 and the one to remove the container 104 from the housing 101, may each be achieved by a single action.

The container 104 may include one or more container guiding member(s) 122 for orienting the container 104 when the container 104 is inserted into the housing 101 through the opening and for holding position in the housing. The container guiding member(s) 122 may be guided by corresponding housing guiding member(s) 123 (shown in FIG. 3B). Further, the container guiding member(s) 122 guide the container 104 in a specific radial orientation that engages interfering components of the release mechanism to automatically engage the release mechanism once the container 104 is fully inserted into the housing 101, and that electrically connects electrical contacts of the container 104 with corresponding electrical contacts of the housing 101.

For example, in the illustrated embodiments, the respective guiding members on the container 104 and housing 101 each include a pair of rails, one pair fitting inside the other so that the container slides on the rails into the housing 101 to longitudinal slide of container 104 within the housing 101 and prevent from rotating inside the housing 101. In other embodiments (not shown) one of the housing 101 and the container 104 includes a guiding member in the form of longitudinal rail and the other of the housing 101 and the container 104 includes a guiding member in the form of a longitudinal channel for receiving the rail to slide the rail along the channel. In any case, one or more rails on the housing may be or comprise a metallic rod associated with the housing 101. In the illustrated embodiments, guiding members are included diagonally opposite locations on the container frame 112, but in other embodiments, only a single guiding member is included on the container frame.

Figure 5A:
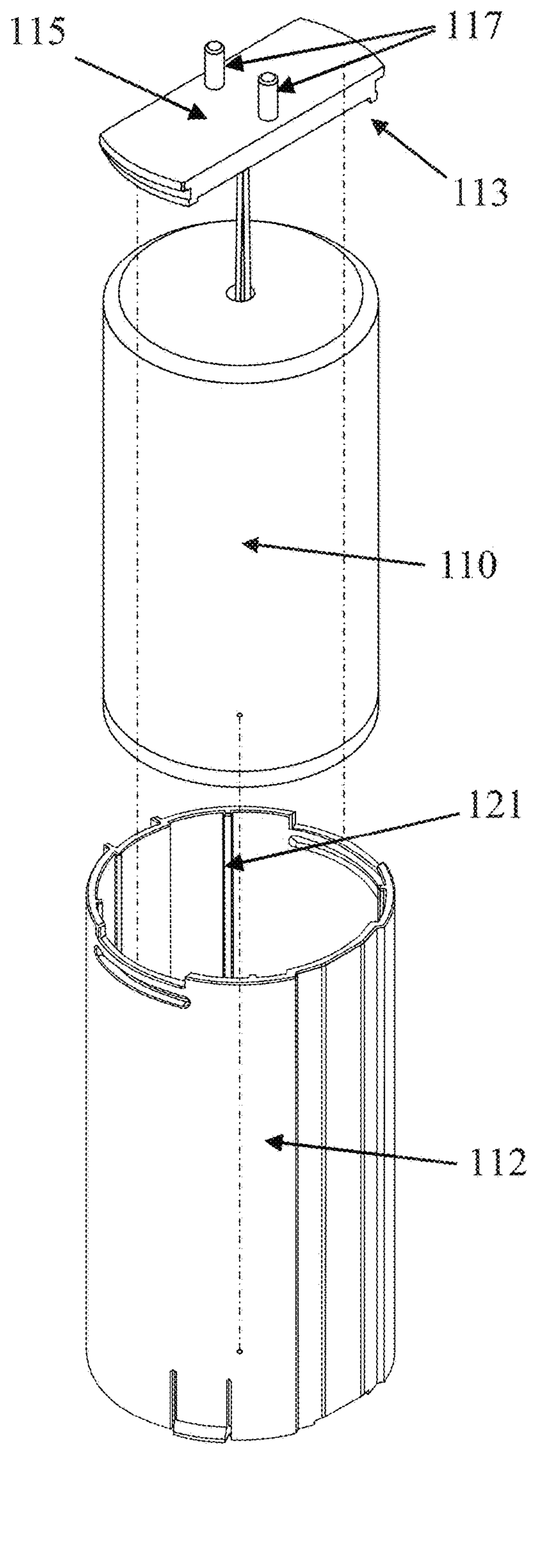
FIGS. 5A and 5B are schematic illustrations of the container of the exemplary obscuration cloud generation device of FIG. 1, with the obscuration cloud generating canister removed, according to some embodiments of the present invention.
Figure 5B:
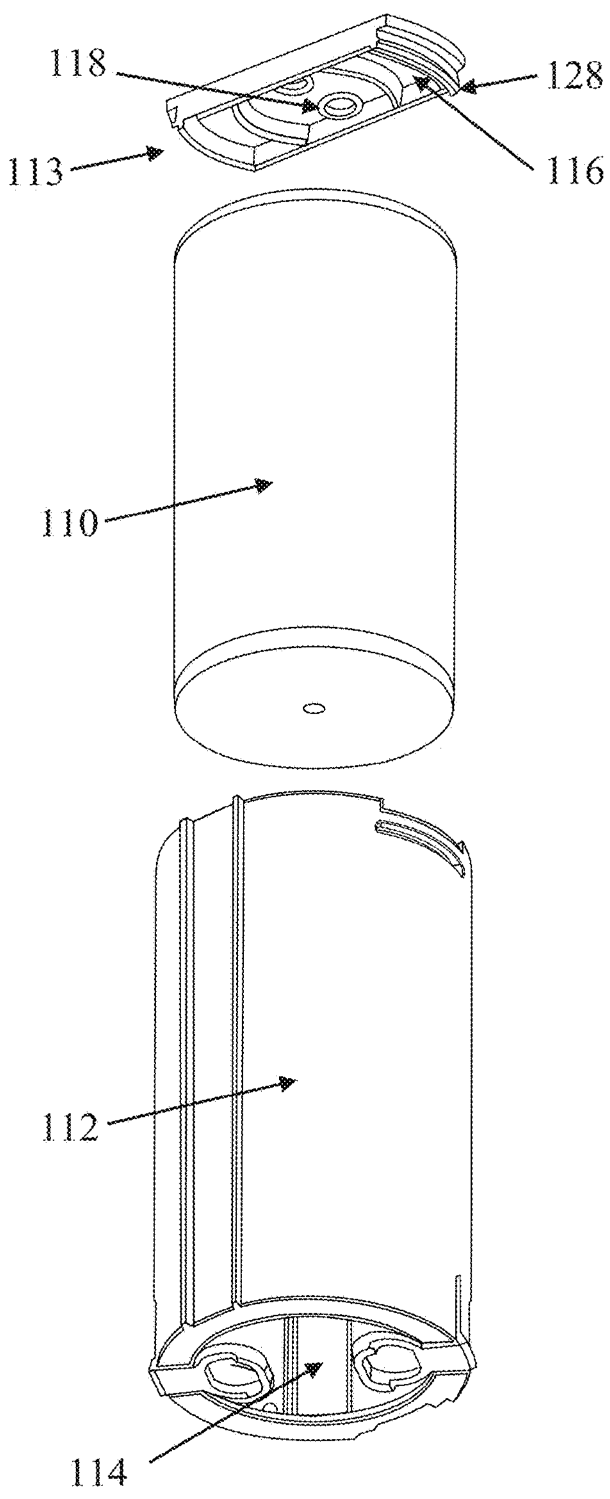
Figure 6:
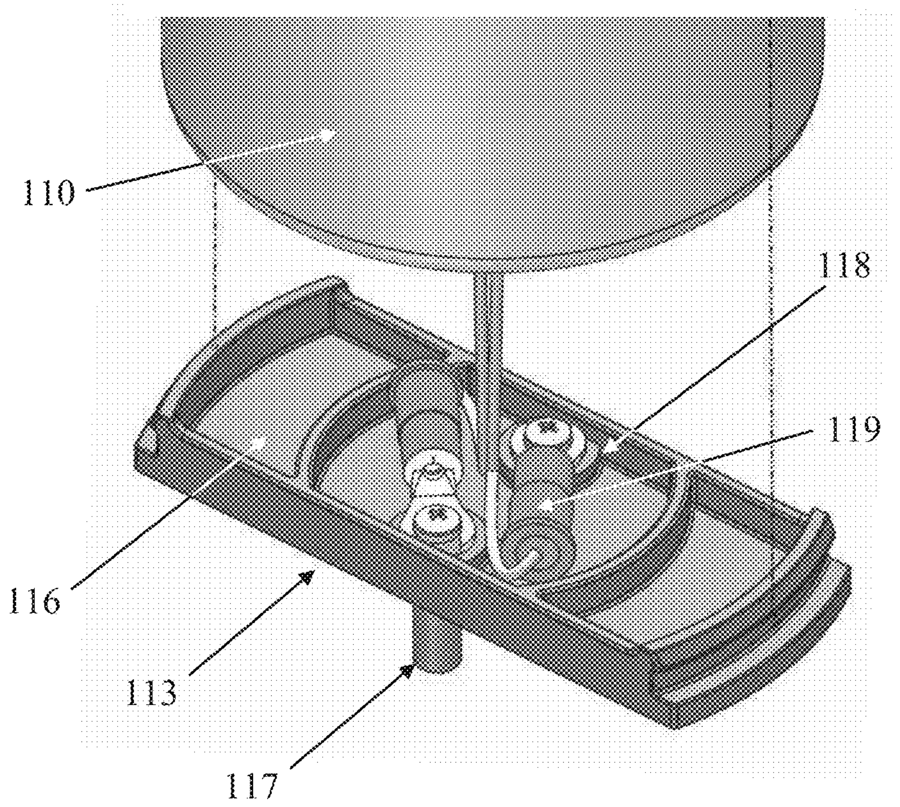
FIG. 6 is a schematic illustration of the container cover of the exemplary obscuration cloud generation device of FIG. 1, according to some embodiments of the present invention.

Reference is now made to FIGS. 5A and 5B, which are schematic illustrations of the container of the exemplary obscuration cloud generation device of FIG. 1, with the obscuration cloud generating canister removed, according to some embodiments of the present invention. Reference is also made to FIG. 6, which is a schematic illustration of the container cover of the exemplary obscuration cloud generation device of FIG. 1, according to some embodiments of the present invention.

Figure 11:
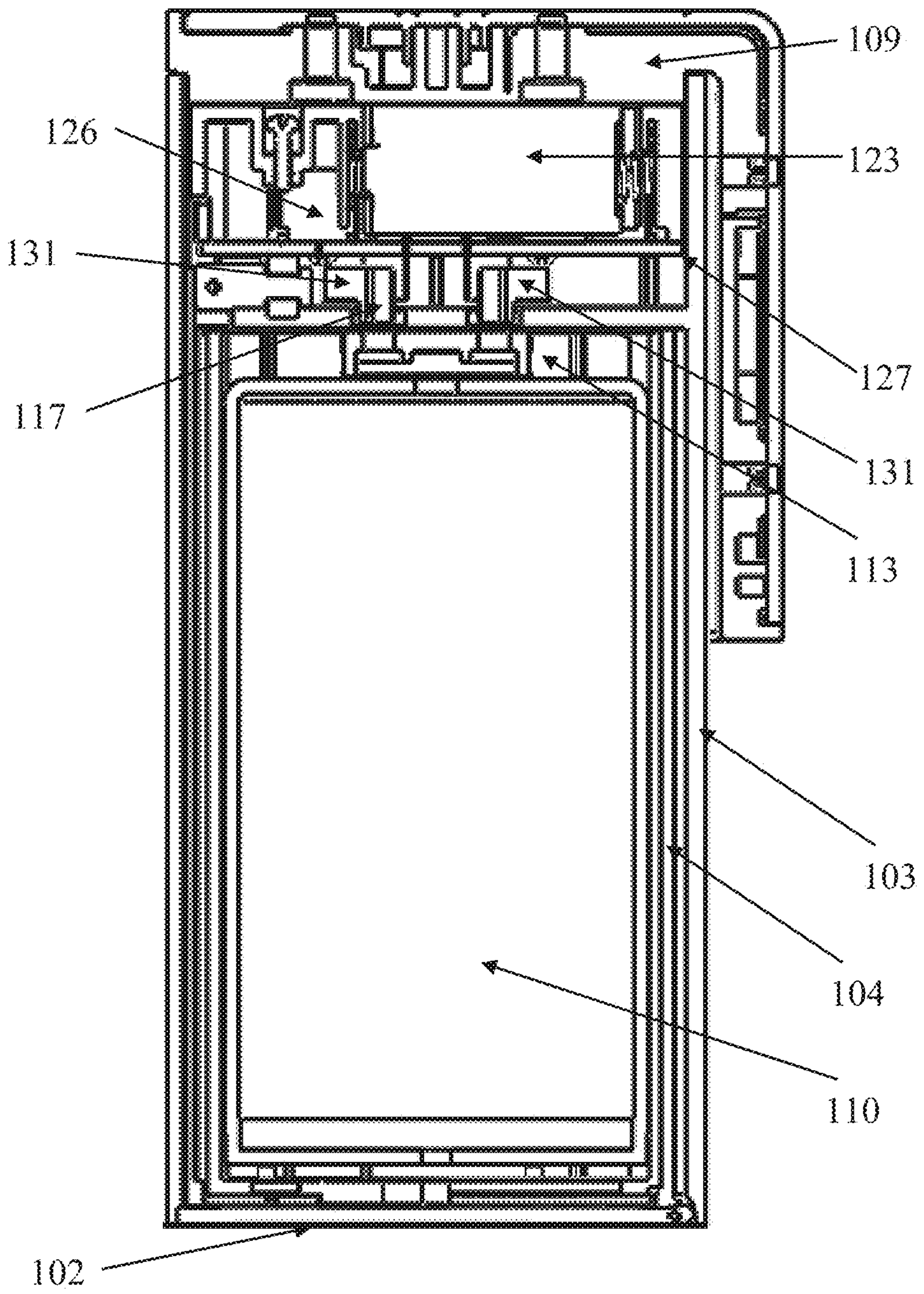
FIG. 11 is a cross-section view illustration of the exemplary obscuration cloud generation device of FIG. 1, according to some embodiments of the present invention.
Figure 12A:
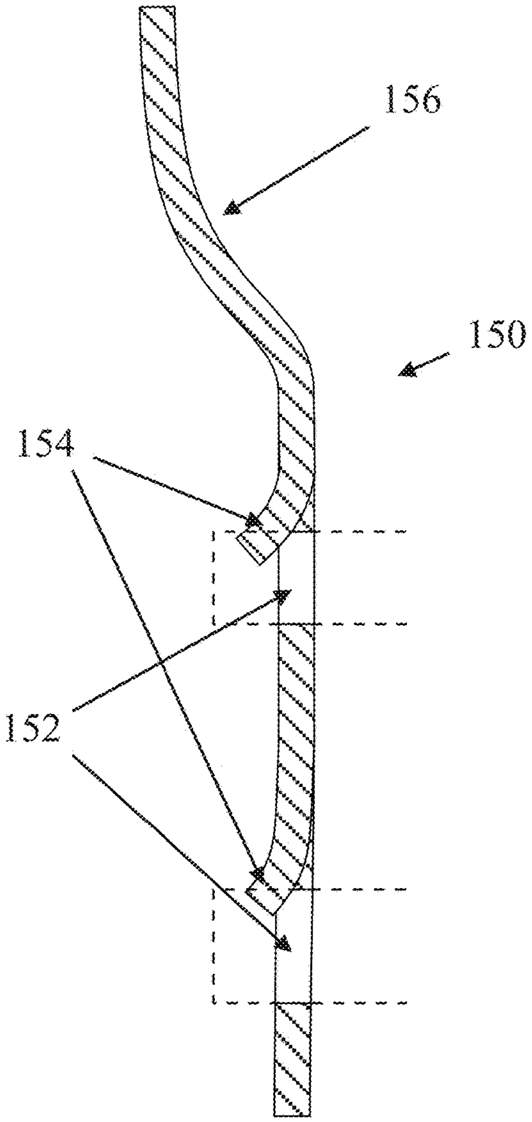
FIGS. 12A and 12B show an exemplary embodiment of a jumper, in a cross-sectional view and a top view respectively, that may be used with a container for holding an obscuration cloud generating canister, in accordance with some embodiments of the invention.
Figure 12B:
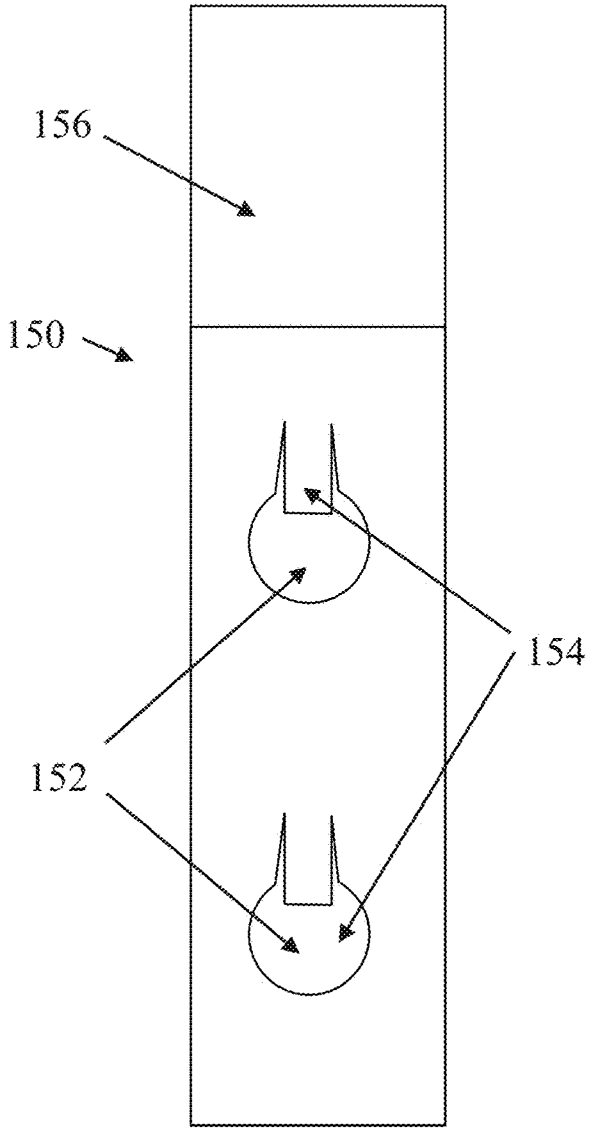

In the illustrated embodiments, the container cover 113 advantageously acts, not only as a cover, but also as an electrical adaptor to present contacts of the obscuration cloud generating canister 110 to an external side of the container 104. Conductors pass through the container cover 113 from an external surface 115 of the container (the surface further from the obscuration cloud generating canister 110) to an internal surface 116 of the container (the surface closer to the obscuration cloud generating canister 110). The conductors present respective external electrical connection terminals 117 fixed on the external surface 115 and corresponding internal electrical connection terminals 118 extending from the internal surface for connecting with corresponding canister contacts 119 of the obscuration cloud generating canister 110. The external electrical connection terminals 117 are connected into electrical contacts 131 (shown in FIG. 11) of the housing 101, when container 104 is inserted into housing 101. Electrical contacts may be positioned laterally to the side and touching each of the external electrical connection terminals 117. Each of the conductors may comprise a plurality of conductive parts or may be a single conductive part. Advantageously, the container cover 113 may include a jumper, which is releasably connected between the external electrical connection terminals 117, the jumper has a relatively low impedance (e.g. orders of magnitude smaller than an input impedance of the canister) to act as an electrical shunt. For example the shunt may be a conductor for short circuiting the canister contacts 119 to prevent unintended activation of the canister 104 by stray charge. An example of a jumper 150 that may be used for this purpose is illustrated in FIGS. 12A and 12B. The jumper 150 in this example is comprised of a flexible sheet of metal, having a pair of holes 152 for the receiving respective external electrical connection terminals 117 that extend from the container cover. The position of the external electrical connection terminals 117 when fitted within the jumper is indicated by broken lines in FIG. 12A. The metal is shaped to include springs 154 (e.g. part of the metal sheet acts as a spring) pushed into the respective external electrical connection terminals 117 to create a low resistance an electrical connection, e.g. a short circuit, between the external electrical connection terminals 117 to thereby mitigate against unintended activation of the canister 110. The jumper may also include a raised tab 156 for easy access and removal from the container cover.

Using a jumper on a container 104 that holds the obscuration cloud generating canister 110, solves technical problem of providing the obscuration cloud generating canister 110 to an end user in such a manner that it is safe to transport and storage yet easy for the user to install. In particular, the obscuration cloud generating canister 110 may be transported and stored already installed in container 104 with a jumper that is easily removed when a user is ready to install the container 104 in the housing 101.

In the illustrated embodiments, the container frame 112 consists of a thermally insulating material, surrounding an entire length of the obscuration cloud generating canister 110. Optionally, the container cover 113 comprises a thermally insulating material, which may be the same insulating material as the container frame 112. The thermally insulating material may have, for example, a melting point of 280° C. or more. The thermally insulating material forms the housing 104 as a rigid casing for dimensional stability to restrict the position of the container 104 within the housing 101. The container frame 112 and/or the container cover 113 may be made entirely of a single material composition, or made of multiple materials. For example, thermally insulating material may include high temperature thermoplastic. More specifically, in some embodiments the material may comprise polycarbonate, and in some embodiments may also comprise fiberglass. The container frame 112 and/or container cover 113 may be made, for example, from a high temperature thermoplastic, having for example a melting temperature of at least 200 degrees, or in some embodiments at least 250 degrees, or in some embodiments at least 280 degrees, for example Makrolon® 2858 manufactured by Covestro, which comprises polycarbonate and has a melting temperature between 280° C. and 320° C. The housing frame 103 may be comprised of the same insulating material or a different material.

The container 104 may also include a container opening 114, at an emission end opposite to the container cover 113, through which the obscuration cloud generating canister 110, when held in the container 104, is substantially exposed for directing dissipation of the heat of the emission via the container opening 114. In some embodiments, "substantially" means that the majority of the bottom surface of the obscuration cloud generating canister 110 is thermally exposed, although in some embodiment some parts of the container opening 114 may be covered for example by the finger-hole clips. In some embodiments, the proportion of the bottom surface of the canister 110 that are exposed as respectively at least 60%, at least 70%, and at least 80%, but optionally leaving a portion of coverage at a periphery of the bottom surface to assist in retaining the obscuration cloud generating canister 110 in the container 104. For example, the portion of coverage at the periphery may be provided by the inwardly extending ridges 130, which in some embodiments cover no more than 10%, or in other embodiments no more than 5%, of the bottom surface of the canister. Therefore, the obscuration cloud generating canister 110 may be thermally insulated from all sides except at the container opening 114. In some embodiments, the only opening in the obscuration cloud generating container 110 is on its bottom side, so that heat, generated by the obscuration cloud generating canister 110 in use, is encouraged to exit via the bottom side of the obscuration cloud generating canister 110 to efficiently exit the housing 101, in the same direction of heat flow, via the opening 105 in the bottom of the housing when the door 102 is open.

Figure 7:
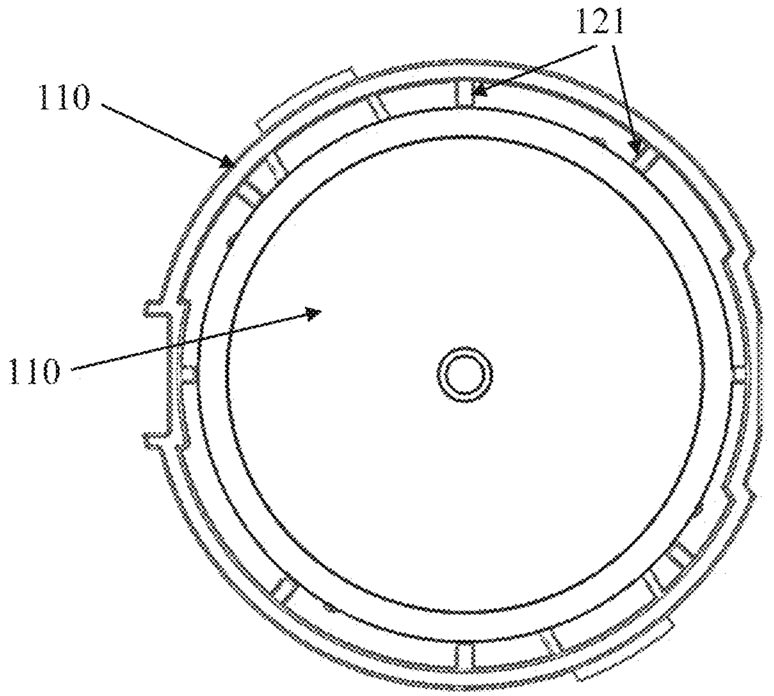
FIG. 7 is a cross-section illustration of the container of the exemplary obscuration cloud generation device of FIG. 1, according to some embodiments of the present invention.

Reference is now made to FIG. 7, which is a cross-section illustration of the container of the exemplary obscuration cloud generation device of FIG. 1, according to some embodiments of the present invention.

Optionally, the container frame 112 includes internal protrusions 121 for holding the obscuration cloud generating canister 110 to create an air gap between the container frame and the obscuration cloud generating canister for further thermal insulation. The protrusions may be, for example, ribs that extend along a longitudinal dimension of the container. The internal protrusions 121 being longitudinal also allows easy insertion of the obscuration cloud generating canister 110 into the container 104 by sliding, as opposed for example to laterally extending internal protrusions.

Figure 8:
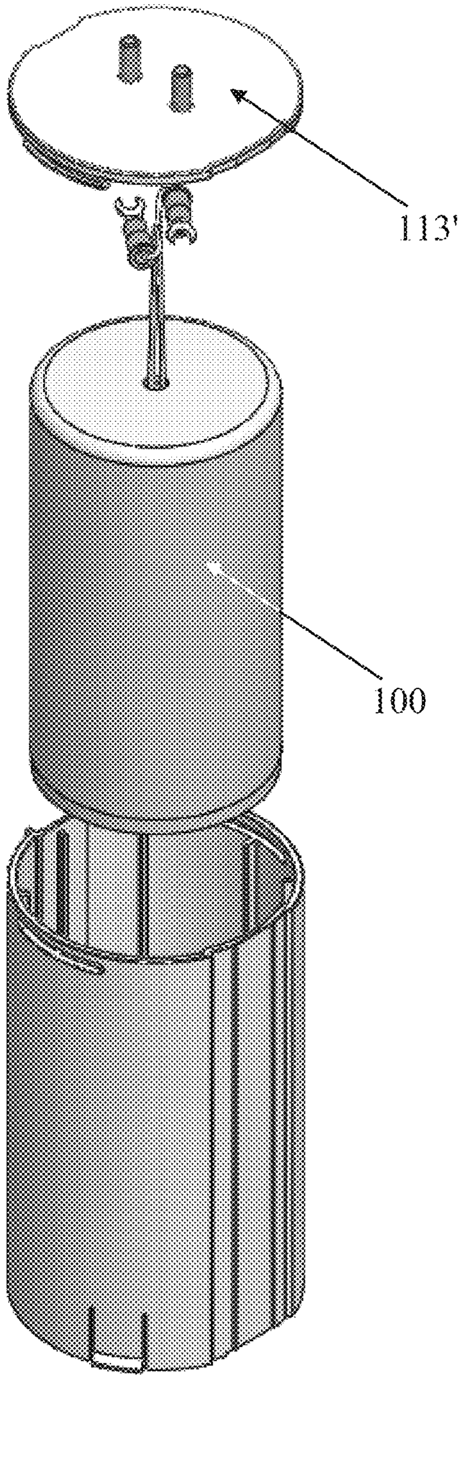
FIG. 8 is a schematic illustration of a container of FIGS. 3A-7, but having a full container cover, according to some embodiments of the present invention.

The container cover may partially cover the end of the obscuration cloud generating canister 110, as shown above with container cover of FIGS. 3A to 6 or may fully cover the end of the obscuration cloud generating canister 110, as shown in the container cover 113' of FIG. 8, in accordance with some embodiments of the invention, to provide greater thermal insulation at the top of the container 104 and further encourage heat dissipation via the bottom opening of the container 104.

Figure 9A:
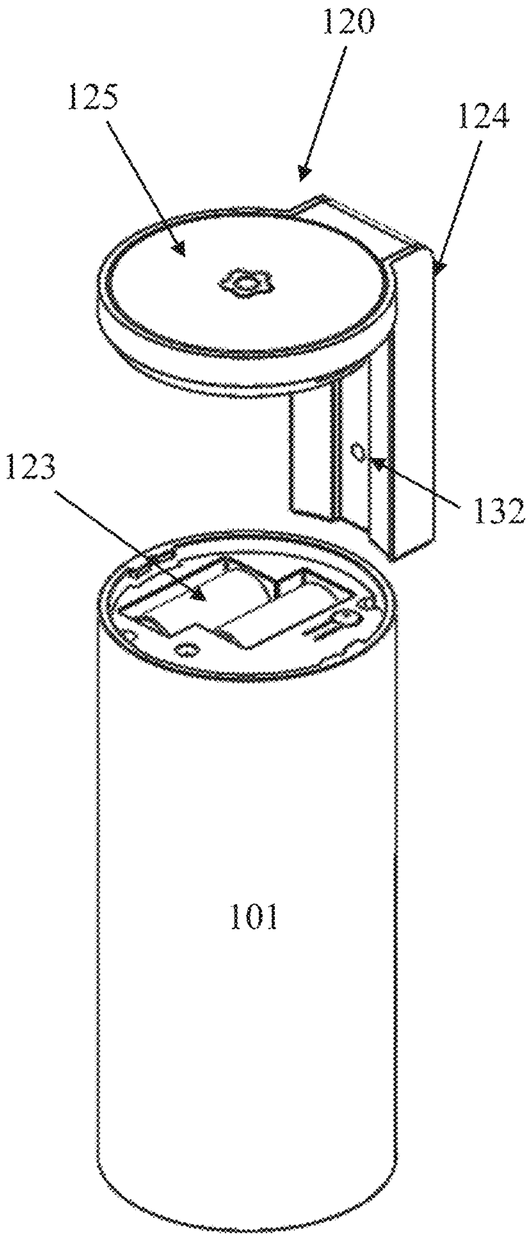
FIGS. 9A and 9B are illustrations of the top part of the obscuration cloud generation device of FIG. 1, showing the housing removed from a mounting portion and respectively showing the batteries inserted inside the housing and removed from the housing, respectively, according to some embodiments of the present invention.
Figure 9B:
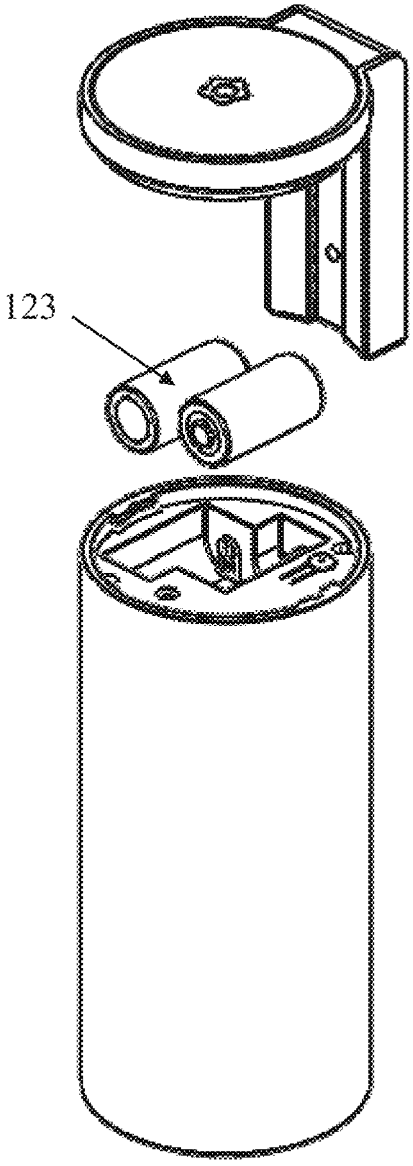

Device 100 may also include a power source, such as one or more batteries. Reference is now made to FIGS. 9A and 9B, which are illustrations of the top part of the obscuration cloud generation device of FIG. 1, showing the housing removed from a mounting portion 120 and respectively showing the batteries 123 inserted inside the housing and removed from the housing, respectively, according to some embodiments of the present invention. The batteries 123 are inserted inside a battery frame 126 that is held by container frame 103.

The mounting portion 120 includes a bracket 124 for mounting with one or more mounting features 132 (e.g. screw holes) for mounting the bracket 124 to a vertical wall so the longitudinal axis of the housing 101 is parallel with the wall and in some implementations may be pointed downwards from a housing-holding part 125 of the mounting portion 120.

Figure 10:
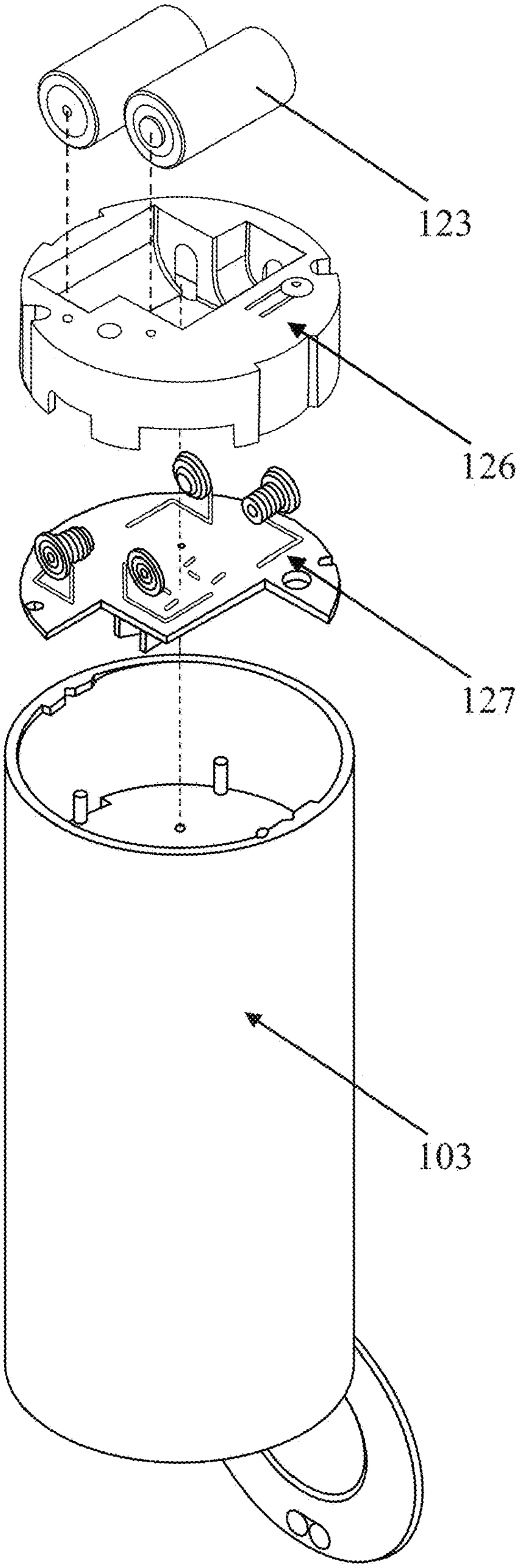
FIG. 10 is an exploded-view illustration of the top part of the exemplary obscuration cloud generation device of FIG. 1, without the mounting portion, according to some embodiments of the present invention.

Reference is now made to FIG. 10, which is an exploded-view illustration of the top part of the exemplary obscuration cloud generation device of FIG. 1, without the mounting portion 120, according to some embodiments of the present invention. Reference is also made to FIG. 11, which is a cross-section view illustration of the exemplary obscuration cloud generation device of FIG. 1, according to some embodiments of the present invention.

As shown in these figures, the device 100 may also include control components adapted to operate device 100 and more specifically configured to control the activation of the obscuration cloud generating canister 110. The control components may be located at an opposite end of frame 103 than the door 102, to be away where the majority of heat is dissipated from the device 100. The control components may be mounted for example on a printed circuit board (PCB) 127. The control components may include a processing circuitry which executes instructions stored in a memory.

Using the device 100 in an exemplary method of replacing the obscuration cloud generating canister 110 without using any tools, may include the following steps: Firstly, the door 102 is opened to access the quick release mechanism 106. In some embodiments, the door 102 is already in an open position as a result of an emission of the cloud obscuration material from the obscuration cloud generating canister 110, thus further reducing the number of steps needed to access the obscuration cloud generating canister 110. In other embodiments the door 102 can be at least partially opened by a controller and motor integrated into the housing 101 to open the door 102 upon receiving a command to do so. In any case, with the door 102 open, the quick release mechanism 106 is then released by a user, allowing the container 104 to slide free from the housing 101. When using a second release mechanism, on the container 104, the container 104 is opened by the user to allow the obscuration cloud generating canister 110 to be freely withdrawn from the container 104. The obscuration cloud generating canister 110 is thereby easily extracted and disposed (e.g. recycled) separately from the container 104. The container 104 may optionally be reused with a new canister, or a new assembly may be acquired having a new container with a new canister already included therein.

In any case the new or replacement container with a new obscuration cloud generating canister may then be slid inside housing 101, guided by the guiding members, and automatically locked into place by the quick release mechanism.

Figure 13:
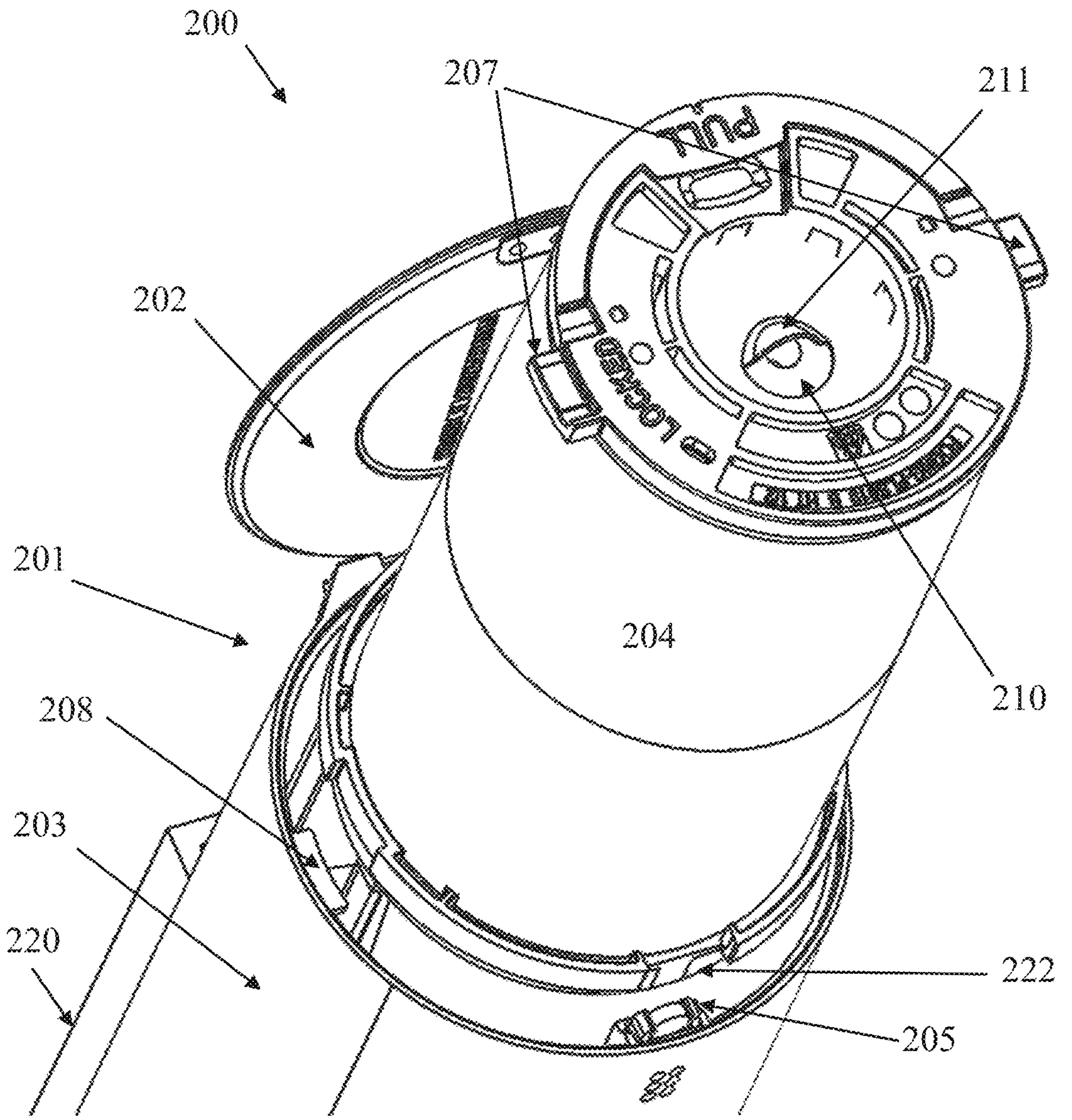
FIG. 13 is a schematic illustration of another exemplary obscuration cloud generation device, according to some embodiments of the present invention.

Reference is now made to FIG. 13, which is a schematic illustration of another exemplary obscuration cloud generation device, according to some embodiments of the present invention. Device 200 includes a housing 201 which includes a door 202 and a frame 203, and a container 104 which holds an obscuration cloud generating canister 210.

Figure 14:
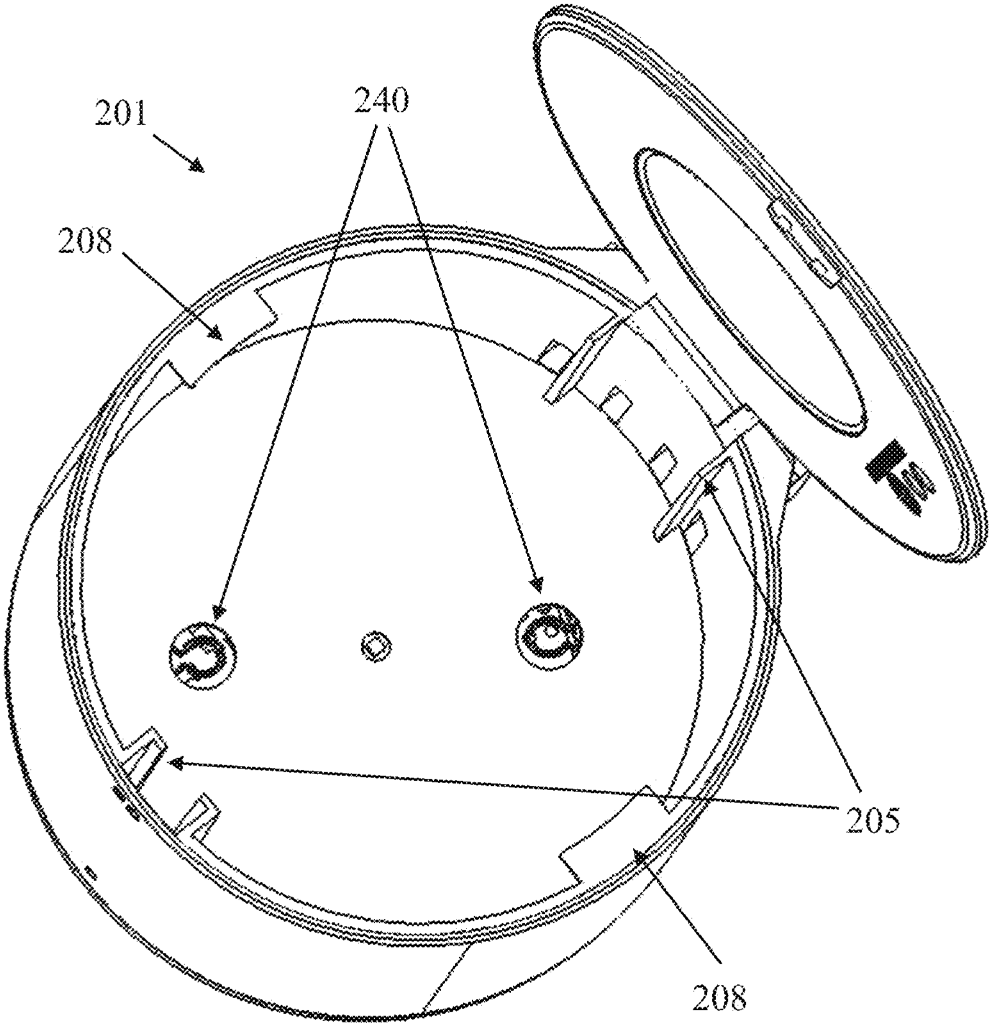
FIG. 14 is a schematic illustration of the housing of the device of FIG. 13, according to some embodiments of the present invention.
Figure 15:
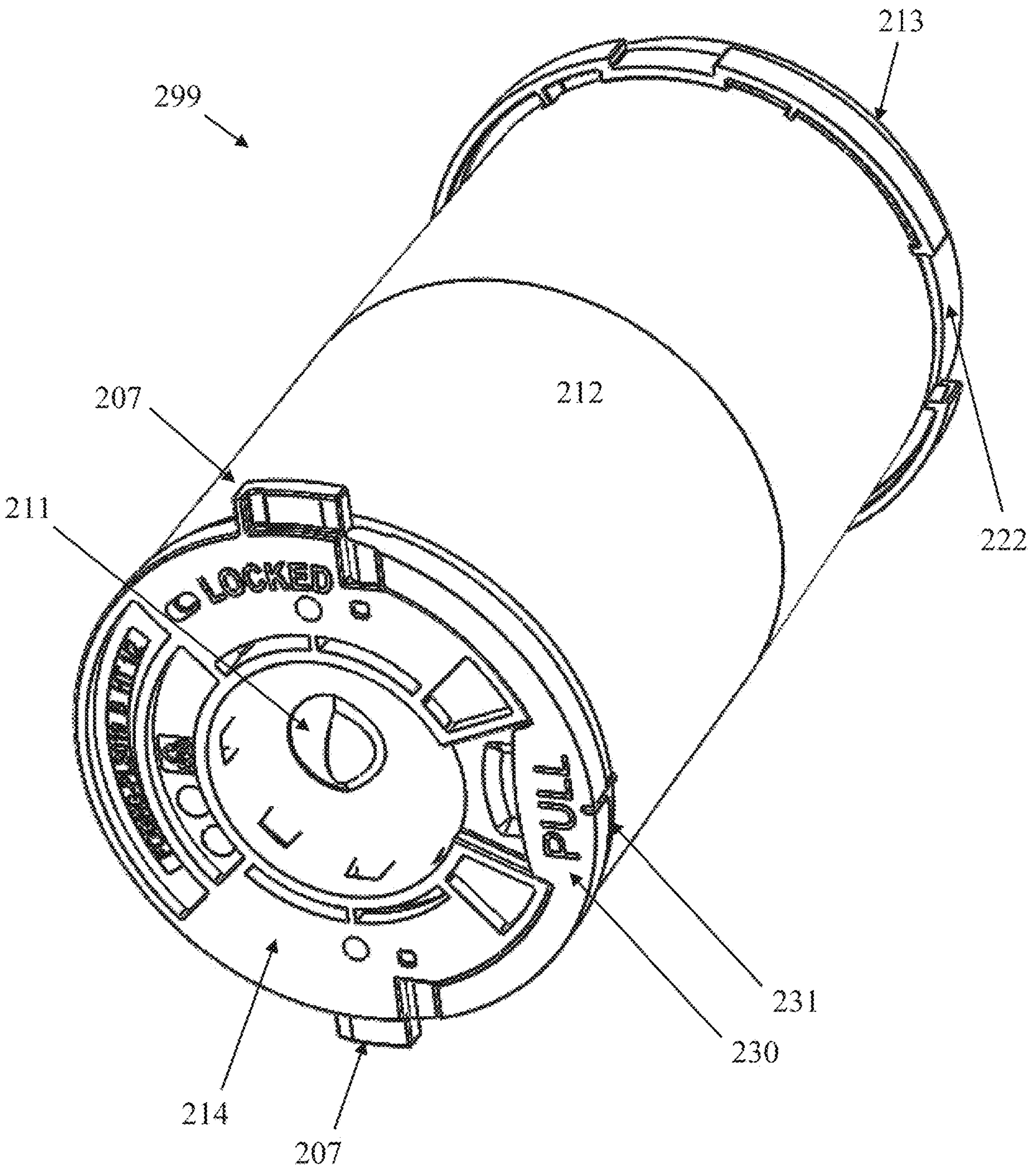
FIG. 15 is a schematic illustration of an assembly that is removable from the housing of the device of FIG. 13, according to some embodiments of the present invention.
Figure 16:
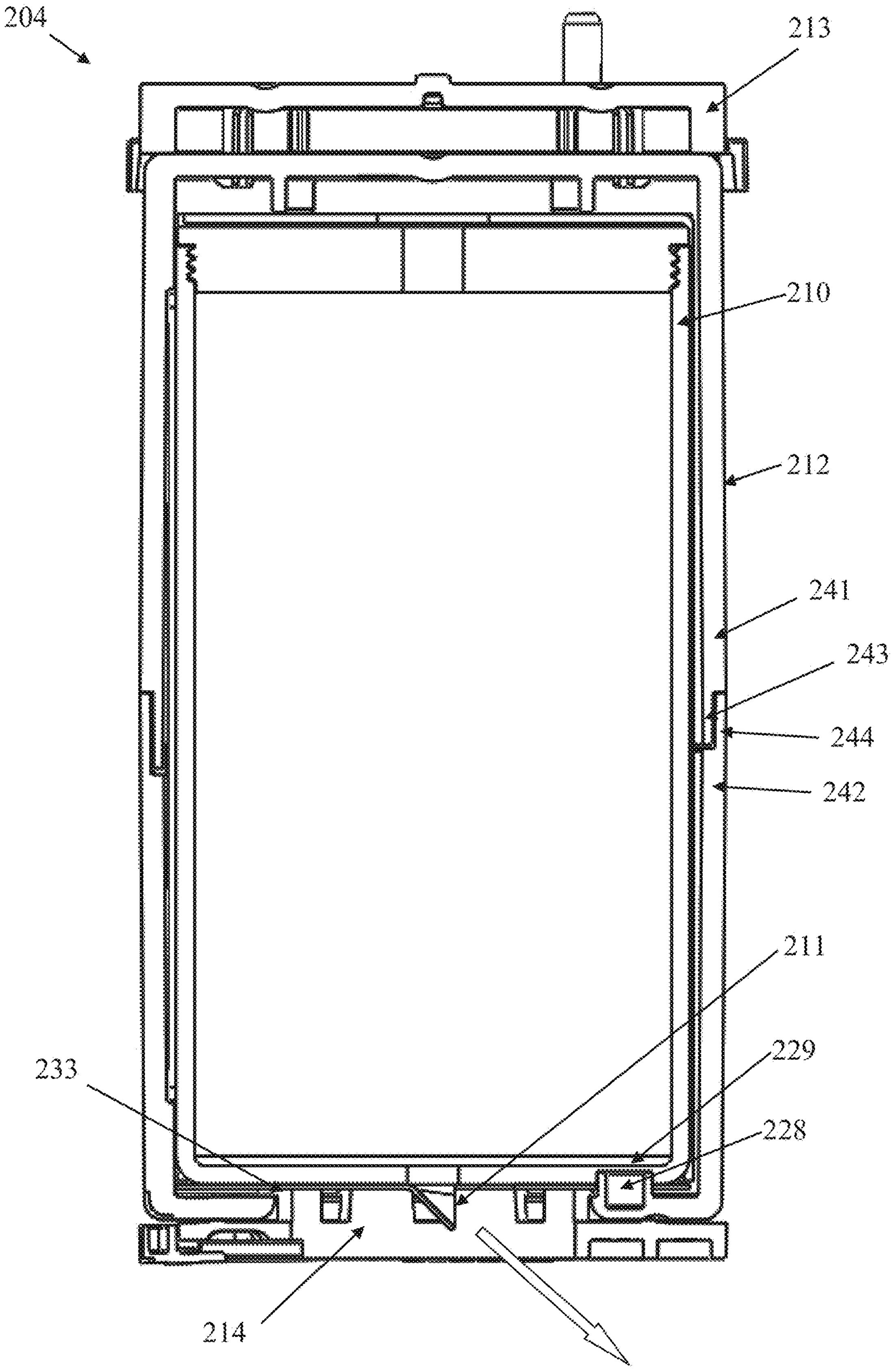
FIG. 16 is a cross-section view illustration of the container of FIG. 15, according to some embodiments of the present invention.

Reference is also made to FIG. 14, which is a schematic illustration of the housing 201 of the device 200 of FIG. 13, according to some embodiments of the present invention, and to FIG. 15, which is a schematic illustration of an assembly 299 that is removable from the housing 201, according to some embodiments of the present invention. Reference is also made to FIG. 16, which is a cross-section view illustration of the assembly 199 of FIG. 15, according to some embodiments of the present invention.

Optionally, the assembly 299 includes a container 204 that holds the cloud generating canister 210. The assembly has an angled outlet 211 at a bottom end of the cloud generating canister 210. When a composition emitted from the obscuration cloud generating canister 210 via the outlet 211, it is emitted in a defined direction that is off a longitudinal axis of the obscuration cloud generating canister 210, and at an angle relative to the bottom surface of the obscuration cloud generating canister 210. The angle of emission is shown by an arrow in FIG. 16. The angle with respect to the bottom surface may be, for example, 60 degrees. With a wall-containing mounting surface 220 of the device 200 against a vertical wall, the longitudinal axis of the obscuration cloud generating canister 210 being vertical, and the cloud generating canister oriented to have the outlet 211 at its bottom, the angle is predetermined to emit the composition downward and away from the wall, such that the emission appears perpendicular to the wall when viewed in plan. This prevents the emitted material from impacting and later being deposited on the door 102 and/or a wall behind the open door 202, as the emitted material is emitted to a direction away from the open door 202 which is vertical when open. The angled outlet 211 may include, for example, a tube, a partial angled cover and/or manifold. The outlet 211 may be metallic to withstand heat.

Optionally, the container 204 includes an alignment element 228 for holding the obscuration cloud generating canister 210 in a specific angular orientation inside the container 104. The specific orientation determines the direction that the composition is emitted from the outlet 211. The alignment element 228 may engage with a corresponding alignment member 229 on the obscuration cloud generating canister 210. For example, the alignment element 228 includes a protrusion or a recess, and the alignment member 229 respectively includes a recess or a protrusion. In this embodiment, alignment element 228 is a protrusion at the bottom part of the container 204 which is inserted into alignment member 229 which is a recess at the bottom of obscuration cloud generating canister 210.

Figure 17:
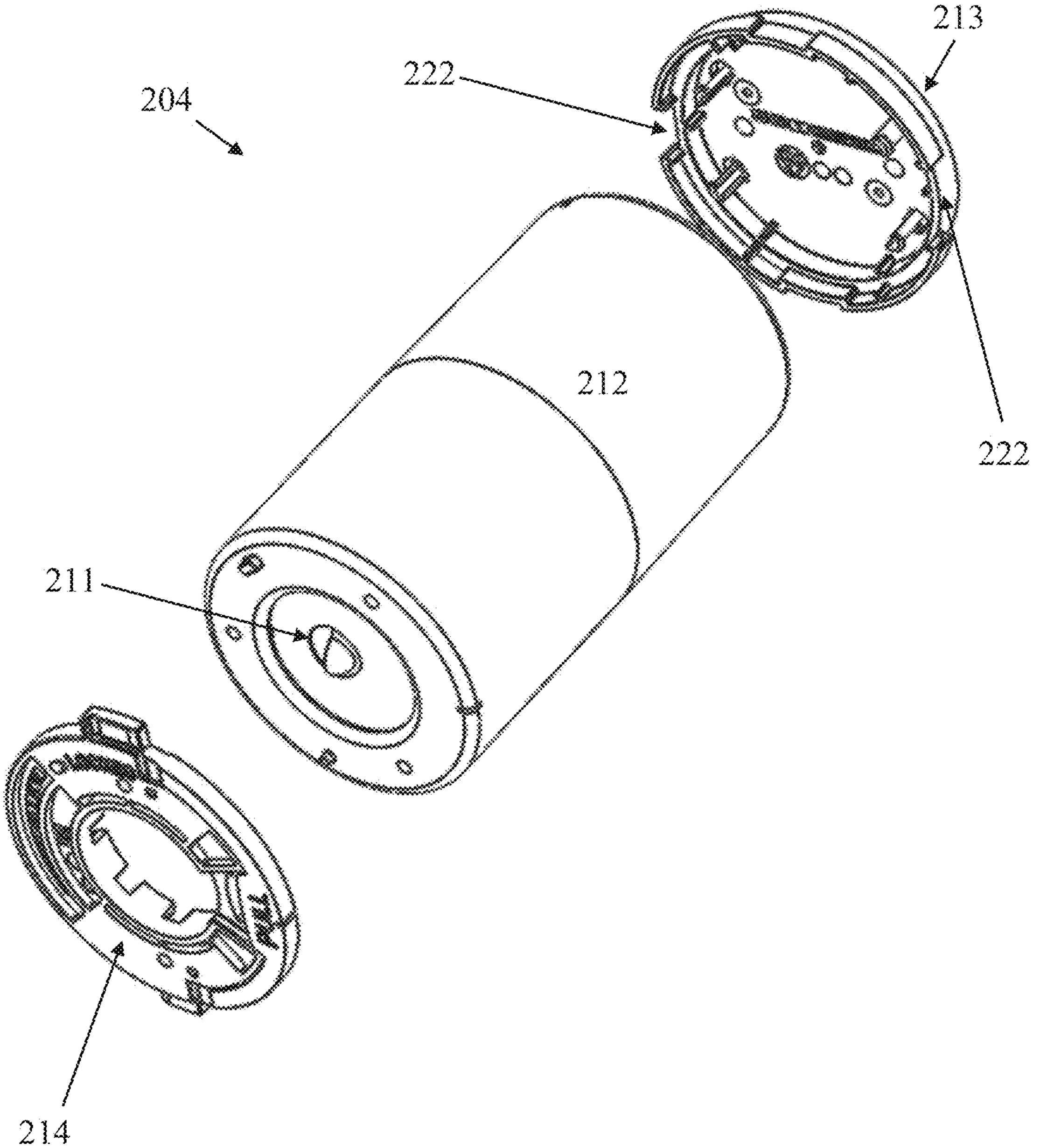
FIG. 17 is a schematic illustration of the container of FIG. 15 showing the container cover and the container bottom part separated from the container body, according to some embodiments of the present invention.

Optionally, the container 204 includes a container body 212, a container cover 213, and/or a container bottom part 214. Reference is now made to FIG. 17, which is a schematic illustration of the container 104 of FIG. 15 showing the container cover 213 and the container bottom part 214 separated from the container body, according to some embodiments of the present invention. The alignment element 228 may be included in the container body 212, the container cover 213, and/or the container bottom part 214.

However, in the exemplified embodiment, the alignment element 228 is included in the container body 212.

The outlet 211 may be on the canister 210, on the bottom part 214 of the container body 212, or on a part therebetween. In some embodiments, the outlet 211 is be provided on sheet metal held between the container body and the canister and that has a hole to receive the alignment member 228 therethrough and it fix its angular alignment.

The container 204 includes one or more container guiding members 222 for orienting the container 204 when the container 204 is inserted into the housing 201. In this embodiment, there are two container guiding members 222 in the form of two diametrically opposed notches or recesses included on the outer circumference of container cover 213. The guiding members 222 fit to and slide along respective longitudinal rails 205 of housing 201, thus aligning the container 204 in a specific angular orientation with respect to housing 201. Additionally or alternatively, the container guiding members 222 may be included in any other part of the container 204. Optionally, each of the container guiding members 222 have different dimensions, corresponding to rails 205 having corresponding different dimensions. This prevents the container 204 from being inserted in the opposite orientation into the housing 201.

Figure 18A:
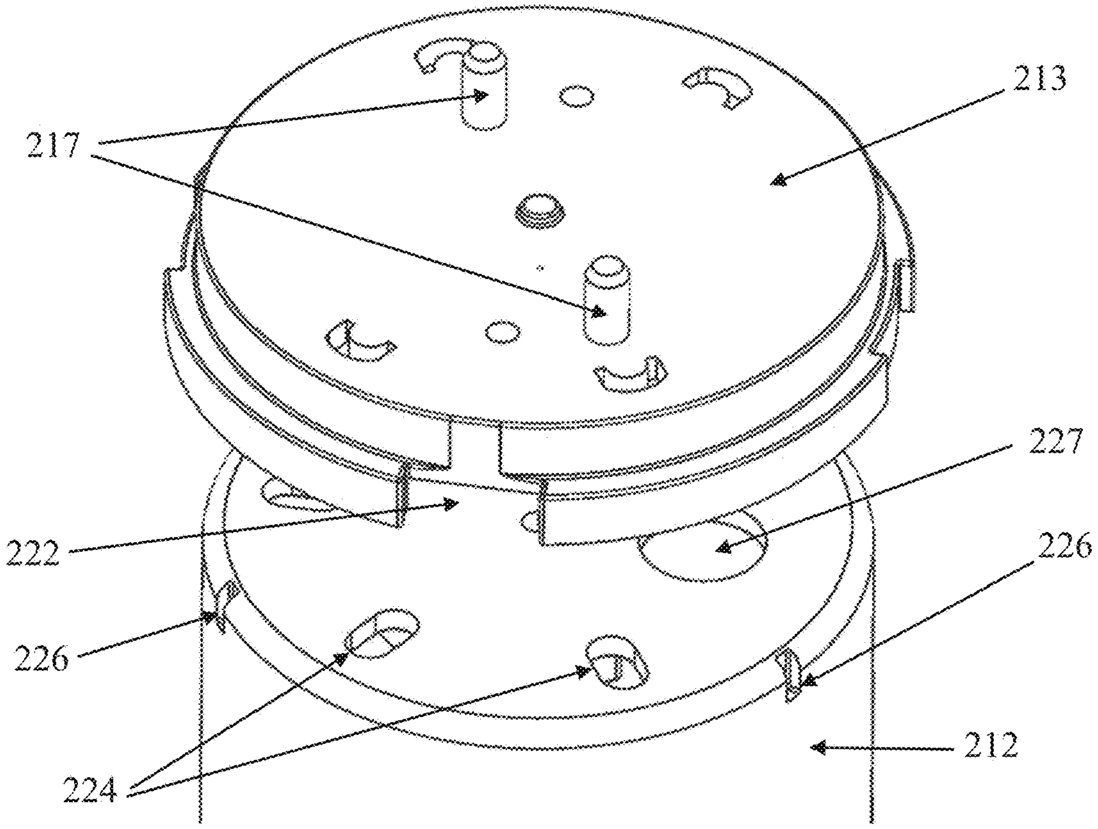
FIGS. 18A and 18B are schematic illustrations of two views of the top of the container body of the container of FIG. 15 and a container cover that caps the top end of the container body, according to some embodiments of the present invention.
Figure 18B:
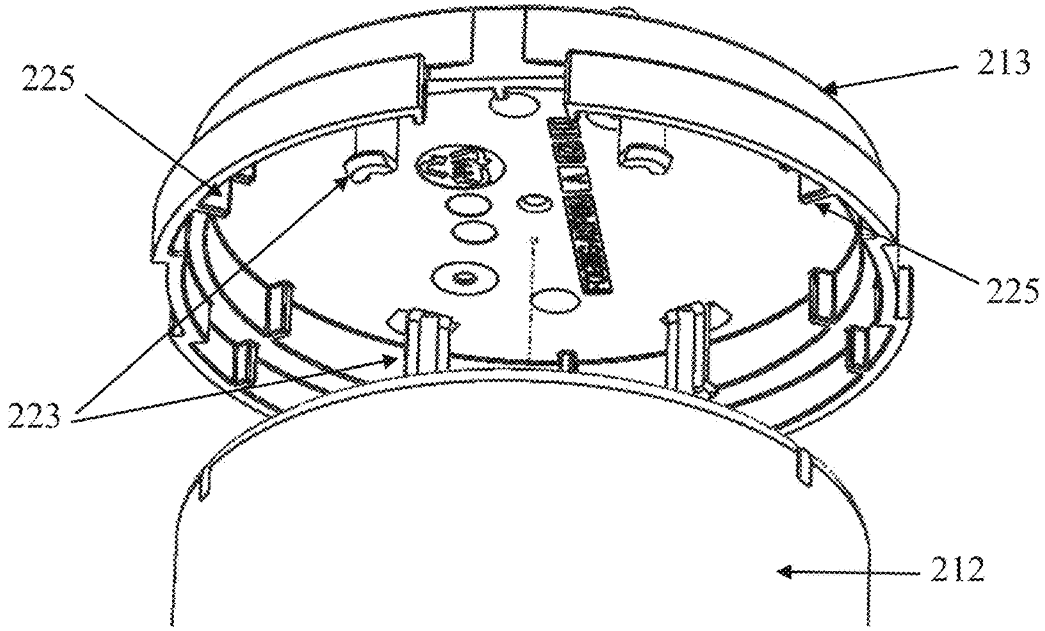

Reference is now made to FIGS. 18A and 18B, which are schematic illustrations of two views of the top of the container body 212 of the container 204 of FIG. 15 and a container cover 213 that caps the top end of the container body, according to some embodiments of the present invention.

Optionally, the container cover 213 connects to the container body 212 via an attachment/mating which determined the angular orientation between them. In this embodiment, the container cover 213 includes four legs 223 that fit into holes 224 in container body 212. The legs 223 may be clipped inside holes 224 by a protrusion in each leg which is inserted through the top surface of the container body 212.

Optionally, the container cover 213 is oriented to the container body 212 via a keyed mating. In this embodiment, the keyed mating is provided by protrusions 225 of container cover 213 that fit inside notches 226 of the container body 212. This determines the angular orientation between the container cover 213 and the container body 212.

Figure 19A:
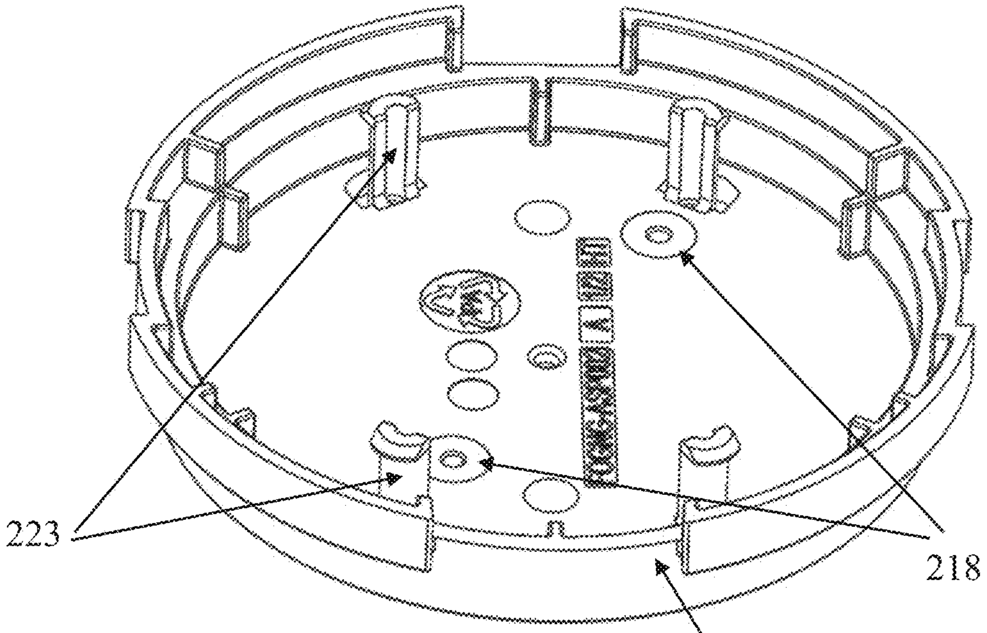
FIGS. 19A and 19B are schematic illustrations of the container cover of the container of FIG. 15, without and with electrical connection terminals, according to some embodiments of the present invention.
Figure 19B:
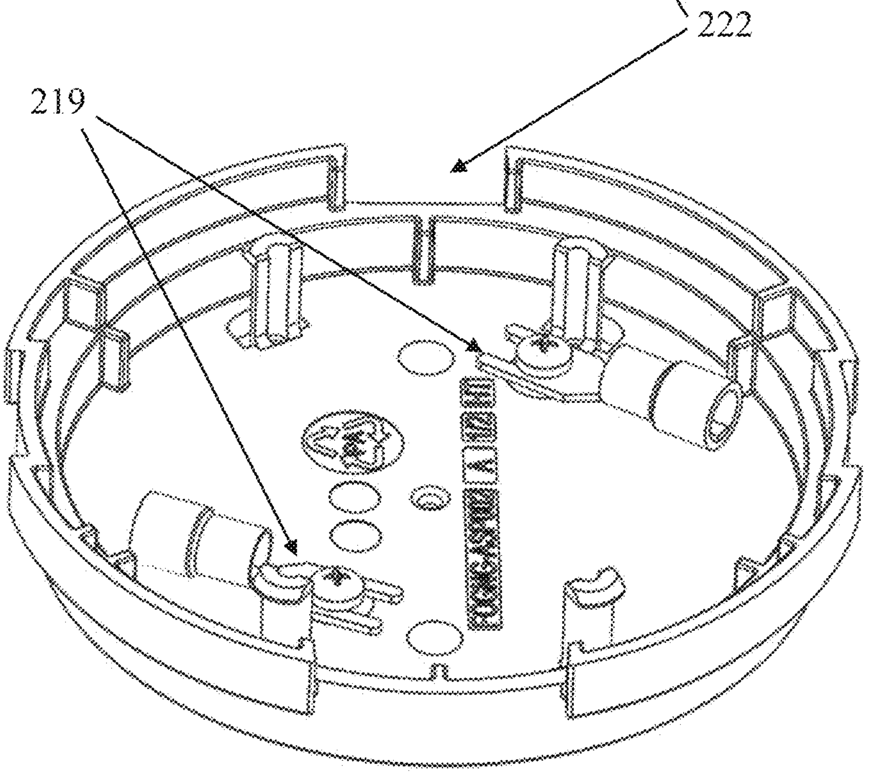

Reference is also made to FIGS. 19A and 19B, which are schematic illustrations of the container cover of the container 204 of FIG. 15, without and with canister connection terminals/contacts 219, according to some embodiments of the present invention. External electrical connection terminals 217 (shown in FIG. 18A) carry power to the obscuration cloud generating canister 210 via the container cover 213. The external electrical connection terminals 217 feed through the cover 213 to present electrical connection terminals 218 on an underside of the cover 213. The external electrical connection terminals 217 are connected into electrical contacts 240 (shown in FIG. 14) of the housing 201, when container 204 is inserted into housing 201 to receive power from an electrical circuit within the housing to activate the canister 210 when needed. The external electrical connection terminals 217 are electrically continuous with the electrical connection terminals 218 located at the inner part of the container cover 213. The canister contacts 219 are screwed to the electrical connection terminals 218 to be held in electrical connection with the electrical connection terminals 218.

Optionally, the top part of the container body 212 includes an opening 227 to allow cables (not shown) connected to the screwed down electrical connection terminals 218 to pass into the obscuration cloud generating canister 210 held within the container 204.

Forcing a specific angular orientation between the container cover 213 and the container body 212, and between the container 204 and the housing 201 ensures that the external electrical connection terminals 217 are exactly positioned to create an electrical connection with electrical contacts 240 of the housing 201.

Optionally, the container 204 is removably held inside the frame 203 by a quick release mechanism 206. In this exemplary embodiment, the quick release mechanism 206 is included in the container bottom part 214. The container bottom part 214 includes bottom part protrusions 207, in the form of laterally extending wings, and which correspond to inwardly directed frame protrusions 208 of frame 203. The container bottom part 214 may be rotated (rotationally movable) with respect to the container body 212. When the container 204 is fully inserted inside the frame 203 of housing 201, and the container bottom part 214 is rotated so that the bottom part protrusions 207 are positioned above the frame protrusions 208, the container 204 is prevented from exiting the housing 201.

Optionally, the container bottom part 214 includes a handle 230 with which the container bottom part 214 may be rotated. The handle 230 has a closed position wherein the handle is laid inside a recess 231 on the container 204, and an open position wherein a force may be applied to turn the handle 230 to remove interference between the bottom part protrusions 207 and the frame protrusions 208, and another force, in this case a linear force, may be applied to pull the handle 230 for releasing the container 204 from the frame 203.

Figure 20A:
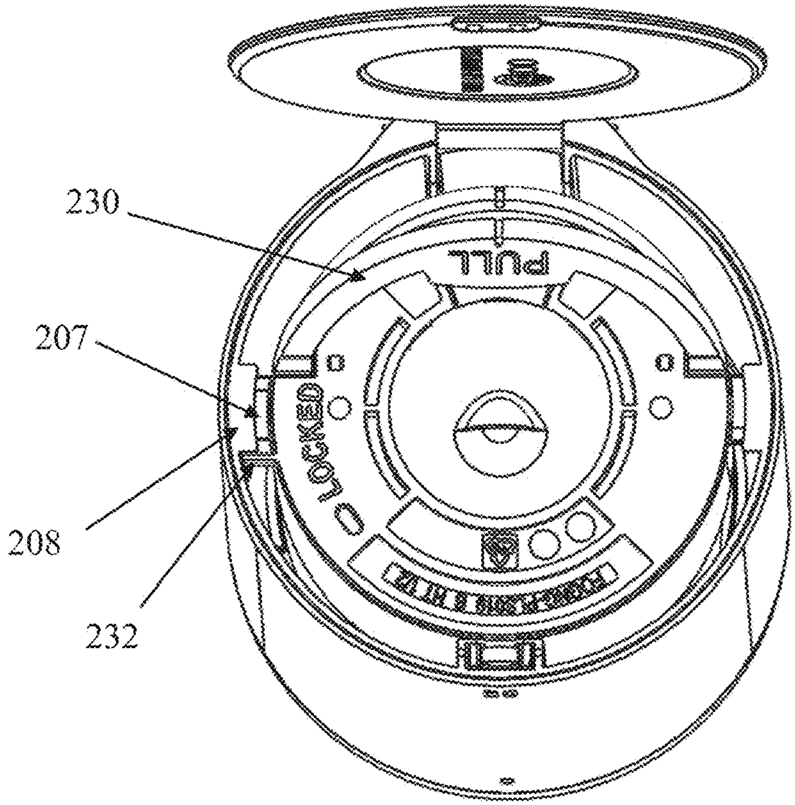
FIGS. 20A and 20B are schematic illustrations of a bottom view of the container of FIG. 15, with different handle positions, according to some embodiments of the present invention.
Figure 20B:
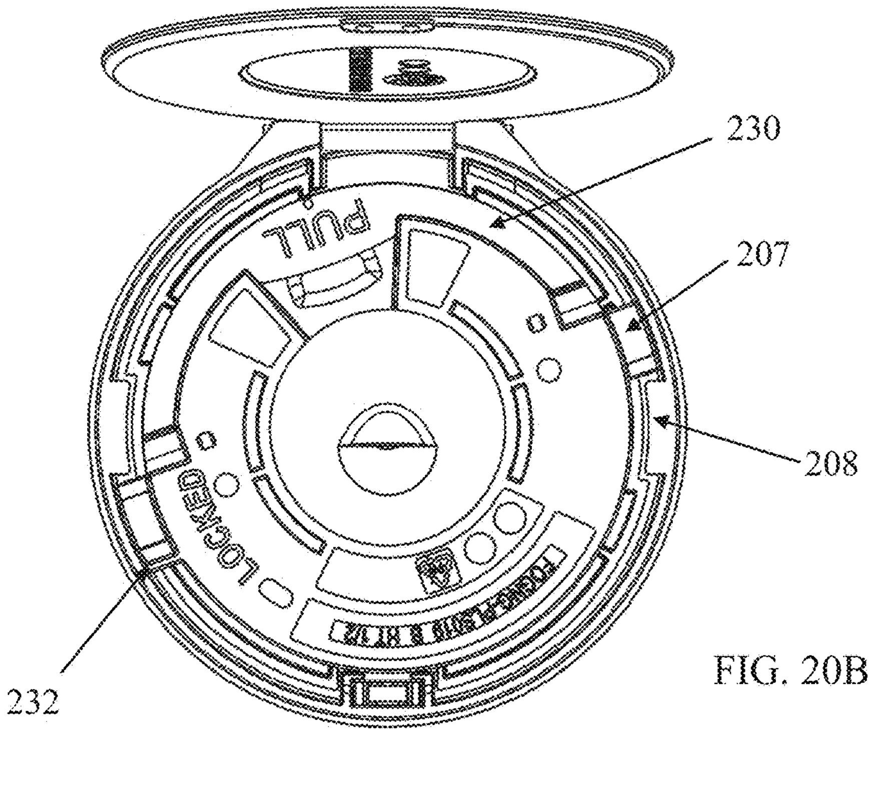

Reference is now made to FIGS. 20A and 20B, which are schematic illustrations of a bottom view of the container 204 of FIG. 15, with different handle positions, according to some embodiments of the present invention. FIG. 20A shows the handle 230 in an open position and the bottom part protrusions 207 locked behind frame protrusions 208. FIG. 20B shows the container 204 after rotating the container bottom part 214 and releasing bottom part protrusions 207. FIG. 20B also shows the handle 230 in a closed position, to which the handle 230 may be pivoted from its open position. However in practice the handle 230 will generally only be placed into its closed position when the container 204 is it its locked configuration within the frame 203. Ordinarily when the container is in the unlocked configuration, the handle will be in its open position and pulled to remove container 204 from the housing 201. Optionally, at least one of the bottom part protrusions 207 and/or frame protrusions 208 includes an ending that prevents the container bottom part 214 from being overly rotated and the bottom part protrusions 207 from being accidentally released or over-rotated. In this embodiment, a left one of the bottom part protrusions 207 includes an end 232 that protrudes in a direction away from the obscuration cloud generating canister 210 to interference with the corresponding the frame protrusion 208 so as to limit amount of rotation so that the container bottom part 214 cannot be rotated past the locked position.

Figure 21:
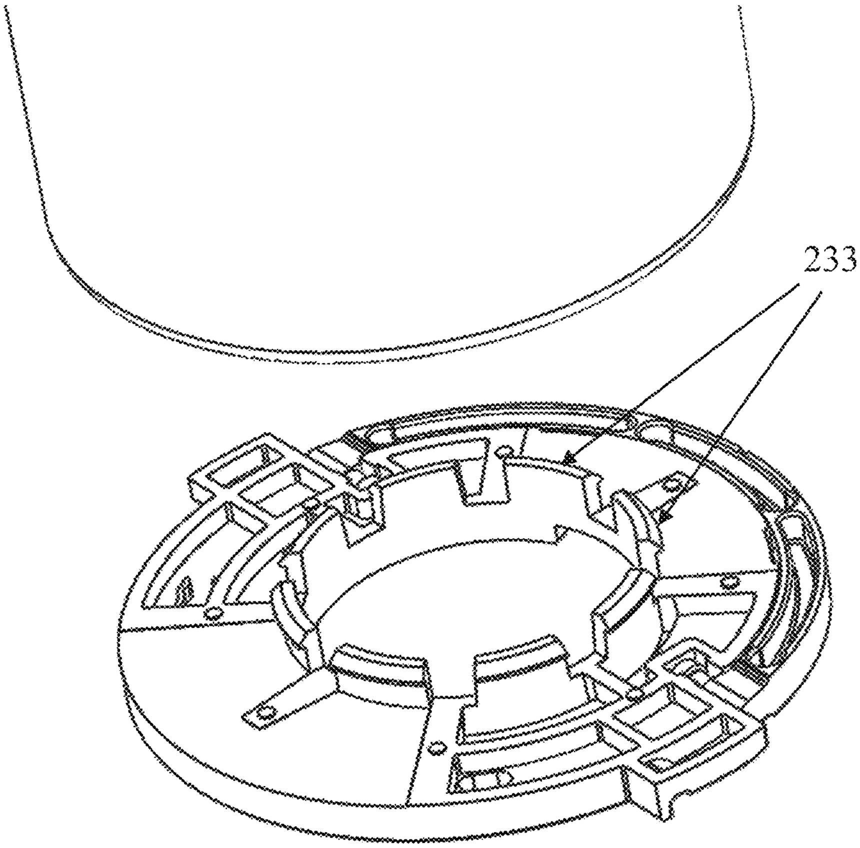
FIG. 21 is a schematic illustrations of the container bottom part of the container of FIG. 15, according to some embodiments of the present invention.

Reference is now made to FIG. 21, which is a schematic illustrations of the container bottom part 214 of the container 204 of FIG. 15, according to some embodiments of the present invention. The container bottom part 214 may include teeth 233 which fit into an opening at the bottom part of the container body 212. When inserted into the opening, the teeth 233 allow container bottom part 214 to be held to the container body yet rotated with respect to the container body 212.

Figure 22:
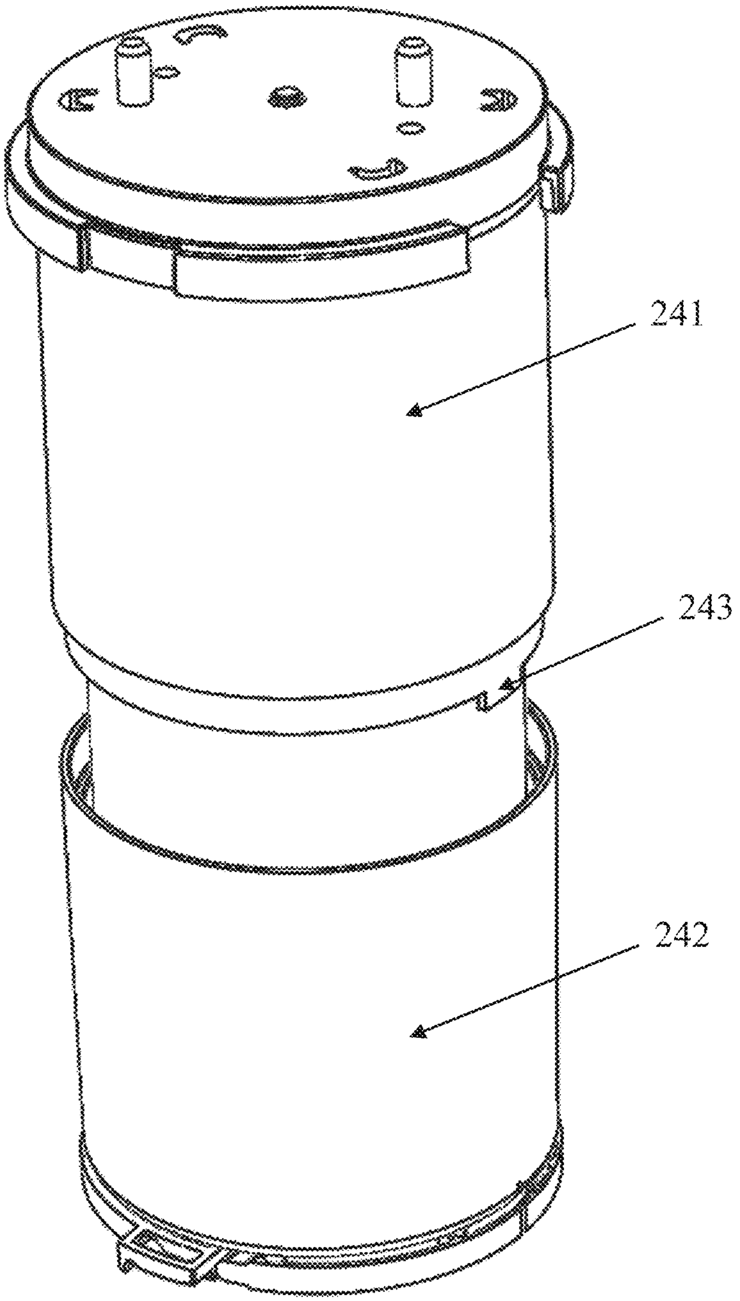
FIG. 22 is a schematic illustrations of the container the container of FIG. 15, in an opened state, according to some embodiments of the present invention.

Reference is now made to FIG. 22, which is a schematic illustrations of the container the container 204 of FIG. 15, in an opened state, according to some embodiments of the present invention. Optionally, container body 212 includes two parts that may be opened and/or closed to extract and/or insert the obscuration cloud generating canister 210 into container 204. A first part 241 and a second part 242 engage with each other to hold the obscuration cloud generating canister 210 therebetween. Optionally, the parts are keyed to predefine an angular orientation with respect to each other. In this embodiment, the first part 241 includes one or more orientation teeth 243 (for example two) which are inserted into corresponding notches 244 in the second part 242 (shown in FIG. 16). This creates an alignment between the container cover 213 (which has the guiding members 222 and which is connected to the first part 241) and the second part 242, which is connected and aligned with the angled outlet 211. Thus, the angling of the outlet 211 is fixed in relation to the guiding members 222 of the container 204 that fix the orientation of the container 204 with respect to the housing 201.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant obscuration cloud generating devices will be developed and the scope of the term obscuration cloud generating device is intended to include all such new technologies a priori.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. An assembly for an obscuration cloud generating device for being removably held within a housing of the obscuration cloud device, the assembly comprising:

an obscuration cloud generating canister, wherein a composition emitted from the obscuration cloud generating canister is emitted via an outlet of the assembly in a defined direction that is off a longitudinal axis of the obscuration cloud generating canister; and at least one guiding member of the assembly for positioning the assembly in a specific angular orientation within and with respect to the housing, so the housing has a fixed positional relationship with respect to the outlet to fix an angle of emission with respect to the housing.

2. The assembly of claim 1, wherein the at least one guiding member includes at least two guiding members, each having different dimensions, each corresponding to at least two housing guiding members having corresponding dimensions.

3. The assembly according to claim 1 wherein the assembly further comprises a container sized and shaped to hold the obscuration cloud generating canister, and the at least one guiding member is on the container.

4. The assembly of claim 3, wherein the container includes a first part and a second part, wherein the first and second parts engage with each other to hold the obscuration cloud generating canister therebetween, and the first and second parts are keyed to predefine an angular orientation of the first part with respect to the second part.

5. The assembly of claim 4, wherein the container further includes a third part that is attachable to the second part, wherein the second and third parts are keyed to predefine an angular orientation of the second part with respect to the third part.

6. The assembly of claim 3, wherein the container includes an alignment element for holding the obscuration cloud generating canister in a specific angular orientation inside the container.

7. The assembly of claim 6, wherein the first part includes the alignment element and the second part includes at least one of the at least one guiding members.

8. The assembly of claim 7, wherein the first part includes the alignment element and the third part includes at least one of the at least one guiding members.

9. The assembly of claim 5, wherein the third part having terminals for conveying power to the obscuration cloud generating canister.

10. The assembly of claim 4, wherein the first and second parts having cylindrical shape.

11. The assembly of claim 6, wherein the alignment element engages with a corresponding alignment member on the obscuration cloud generating canister.

12. The assembly of claim 3, wherein the container is removably held inside the housing by a quick release mechanism.

13. The assembly of claim 12 wherein the quick release mechanism comprising at least one member on the container for selectively engaging or disengaging from a corresponding member on the housing to respectively secure the container in the housing or enable withdrawal of the container from the housing.

14. The assembly of claim 12, wherein the quick release mechanism comprising a handle.

15. The assembly of claim 12, wherein at least some parts of the quick release mechanism are rotationally movable with respect to the at least one guiding member for the removal.

16. A system, comprising:

an obscuration cloud generation device having a housing; and an assembly for being removably held within the housing of the obscuration cloud device, the assembly comprising:

an obscuration cloud generating canister, wherein a composition emitted from the obscuration cloud generating canister is emitted via an outlet of the assembly in a defined direction that is off a longitudinal axis of the obscuration cloud generating canister; and at least one guiding member of the assembly for positioning the assembly in a specific angular orientation within and with respect to the housing, so the housing has a fixed positional relationship with respect to the outlet to fix an angle of emission with respect to the housing.

17. The system of claim 16, wherein the assembly further comprises a container sized and shaped to hold the obscuration cloud generating canister, and the at least one guiding member is on the container; wherein the quick release mechanism comprising a handle; wherein the handle having a closed position wherein the handle is laid inside a recess on the container, and an open position wherein a force may be applied to turn the handle and another force may be applied to pull the handle for releasing the container from the housing.

18. The system of claim 16, wherein the at least one guiding member includes at least two guiding members, each having different dimensions, each corresponding to at least two housing guiding members having corresponding dimensions.

19. The system of claim 16, wherein the at least one guiding member includes at least two guiding members, each having different dimensions, each corresponding to at least two housing guiding members having corresponding dimensions; wherein the container is removably held inside the housing by a quick release mechanism.

20. The system of claim 16, wherein the at least one guiding member includes at least two guiding members, each having different dimensions, each corresponding to at least two housing guiding members having corresponding dimensions;

wherein the container is removably held inside the housing by a quick release mechanism;

wherein the quick release mechanism comprising at least one member on the container for selectively engaging or disengaging from a corresponding member on the housing to respectively secure the container in the housing or enable withdrawal of the container from the housing.

* * * * *